(12) United States Patent
Sarcia

(10) Patent No.: US 9,638,591 B1
(45) Date of Patent: May 2, 2017

(54) DISPLAY AREA FORCE SENSING USING BRAGG GRATING BASED WAVE GUIDE SENSORS

(71) Applicant: Apple Inc., Cupertino, CA (US)

(72) Inventor: Sam R. Sarcia, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 456 days.

(21) Appl. No.: 13/902,726

(22) Filed: May 24, 2013

(51) Int. Cl.
*G01L 1/24* (2006.01)
*G02B 6/34* (2006.01)

(52) U.S. Cl.
CPC .............. *G01L 1/246* (2013.01); *G01L 1/247* (2013.01); *G02B 6/34* (2013.01)

(58) Field of Classification Search
CPC ................... G06F 3/042; G06F 3/0421; G06F 2203/04109; G01L 1/246; G01L 1/247; H02B 6/34
USPC .................................................. 345/175–176
See application file for complete search history.

(56) References Cited

U.S. PATENT DOCUMENTS

| | | | |
|---|---|---|---|
| 7,211,885 B2 | 5/2007 | Nordal et al. | |
| 8,402,834 B1 * | 3/2013 | Moslehi et al. | 73/705 |
| 8,547,350 B2 | 10/2013 | Anglin et al. | |
| 2002/0150336 A1 * | 10/2002 | Davis | G02B 6/022 385/37 |
| 2005/0232532 A1 * | 10/2005 | Wang | A61B 5/6892 385/13 |
| 2005/0269489 A1 * | 12/2005 | Taverner | 250/227.14 |
| 2010/0103140 A1 * | 4/2010 | Hansson | G06F 3/0421 345/175 |
| 2011/0302694 A1 * | 12/2011 | Wang | A61B 5/103 2/160 |
| 2012/0038577 A1 | 2/2012 | Brown et al. | |
| 2012/0068970 A1 * | 3/2012 | Pemberton-Pigott | 345/175 |

OTHER PUBLICATIONS

Bau, et al., "TeslaTouch: Electrovibration for Touch Surfaces," UIST'10, Oct. 3-6, 2010, New York, New York USA, 10 pages.
Feist, "Samsung snags patent for new pressure sensitive touch-screens," posted on AndroidAuthority.com at URL: http://www.androidauthority.com/samsung-patent-pressure-sensitive-touch-screens-354860, Mar. 7, 2014, 1 page.

* cited by examiner

*Primary Examiner* — William Boddie
*Assistant Examiner* — Saifeldin Elnafia
(74) *Attorney, Agent, or Firm* — Brownstein Hyatt Farber Schreck, LLP

(57) ABSTRACT

An electronic device includes an input surface area for receiving a force applied by a user and one or more optical waveguides that include Bragg gratings. The optical waveguide or waveguides is operatively affixed to the input surface area. At least one light source is optically coupled to the optical waveguide or waveguides. At least one wavelength interrogator is coupled to the optical waveguide or waveguides.

17 Claims, 21 Drawing Sheets

DISPLAY AREA FORCE SENSING USING BRAGG GRATING BASED WAVE GUIDE SENSORS

TECHNICAL FIELD

This disclosure generally relates to sensing a force exerted against a surface, and more particularly to sensing force applied by a user upon an input surface by measuring deviations in wavelength reflected from a Bragg grating attached to the surface.

BACKGROUND

Touch-sensitive input elements can provide to a connected computing system descriptive information of the location and duration of a user's contact with the surface of the input element. Descriptive touch information may include various combinations of location and duration information that also provide for the detection of a user's movement or a user's gesture, among other touch events such as a tap, across the surface of the input element. When provided to a connected computing system, descriptive touch information may enable a user's interaction with visible interface elements such as on-screen keyboards or selectable menu items, or in other cases may enable other user interaction such as swiping to advance to the next image in a series, or dragging to adjust the center of a displayed map.

Some touch-sensitive input elements are able to provide descriptive touch information for a plurality of simultaneous touch events (i.e. multi-touch input elements). Various combinations of location and duration information of multiple simultaneous contact points may provide for multi-point user gestures. For example, a user may move two separated fingers closer together to adjust the zoom of a webpage (i.e. pinching), or a user may pivot one finger about the other to adjust the orientation of a photo (i.e. rotation).

Generally, descriptive touch information for either single-touch or multi-touch input elements includes only location and duration and various combinations thereof. Further, whether a touch event occurred is binary in that there is no ability to distinguish between forceful touch events and light touch events. In other words, very few touch-sensitive input elements employ downward touch force as a variable input.

SUMMARY

Embodiments described herein may relate to, or take the form of an electronic device comprising an input surface area for receiving a force applied by a user, an optical waveguide comprised of a plurality of Bragg gratings, a light source optically coupled to the at least one optical waveguide, a wavelength interrogator optically coupled to the at least one optical waveguide, and wherein the optical waveguide is operatively affixed to the input surface area, and each of the plurality of Bragg gratings reflecting a different Bragg reflection.

In some embodiments, the at least one optical waveguide can comprise a substantially transparent fiber.

In further embodiments, the at least one optical waveguide can be etched onto a surface of the at least one input surface.

In further embodiments, the electronic device can comprise at least one of a display, a button, and a trackpad.

In further embodiments, the electronic device can include one or more temperature sensors and one or more touch sensors.

In further embodiments, the electronic device can include one or more processors for determining an amount of force applied to the input surface.

In further embodiments, at least a first and a second optical waveguide can each comprise of a plurality of Bragg gratings.

In further embodiments each of the plurality of Bragg gratings of the at least a first optical waveguide can reflect a different Bragg reflection.

In further embodiments each of the plurality of Bragg gratings of the at least a second optical waveguide can reflect a different Bragg reflection.

In still further embodiments each of the plurality of Bragg gratings of the at least a first optical waveguide may reflect a different Bragg reflection, each of the plurality of Bragg gratings of the at least a second optical waveguide reflect a different Bragg reflection, and each of the plurality of Bragg gratings of the at least a first optical waveguide may be identical to only one of the plurality of Bragg gratings of the at least a second optical waveguide.

In further embodiments, the light source may comprise a superluminescent diode. In other embodiments, the light source may comprise a tunable sweep laser.

Still other embodiments may take the form of a method of measuring force in an electronic device, the method comprising receiving a force input to an input surface area, the input surface area operatively affixed to an optical waveguide comprising a Bragg grating having a reflection wavelength, the Bragg grating formed at a location on the optical waveguide, activating a light source optically coupled to the optical waveguide, receiving a reflection wavelength from the Bragg grating, determining the actual Bragg reflection, determining an adjusted reflection by modifying the actual reflection to compensate for effects of temperature, determining a change in wavelength from the difference between the adjusted reflection and the actual Bragg reflection, and calculating a force applied at the location on the optical waveguide based on the change in wavelength.

In further embodiments, the method can also include determining an adjusted reflection by modifying the actual Bragg reflection to compensate for effects of force resistivity at the location on the optical waveguide.

In further embodiments, the method may also include determining an adjusted reflection by modifying the actual Bragg reflection to compensate for effects of thermal hysteresis at the location on the optical waveguide.

In other embodiments, a method of measuring force in an electronic device can receiving a force input to an input surface area, the input surface area operatively affixed to a plurality of optical waveguides each comprising a plurality of Bragg gratings each having a different reflection wavelength, the plurality of Bragg gratings formed at different locations on each of the plurality of optical waveguides, determining an impacted area of the received force input, determining the impacted optical waveguides associated with the impacted area, activating a light source optically coupled to the impacted optical waveguides, receiving a reflection spectrum from the impacted optical waveguides, determining at least one actual Bragg reflection, determining an adjusted reflection by modifying each of the at least one actual Bragg reflections to compensate for effects of temperature, determining a change in reflection from the difference between the adjusted reflection and the actual Bragg reflection, and calculating a force applied at the location on the optical waveguide based on the change in wavelength.

In further embodiments, the method may also comprise determining an adjusted reflection by modifying each of the at least one actual Bragg reflections to compensate for effects of force resistivity at the location on the optical waveguide.

In further embodiments, the method can also comprise determining an adjusted reflection by modifying each of the at least one actual Bragg reflections to compensate for effects of thermal hysteresis at the location on the optical waveguide.

BRIEF DESCRIPTION OF THE DRAWINGS

Reference will now be made to representative embodiments illustrated in the accompanying drawings. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims. It may also be noted that many of the accompanying drawings are illustrated at an exaggerated scale.

DETAILED DESCRIPTION

Terminology

Figure 1A:
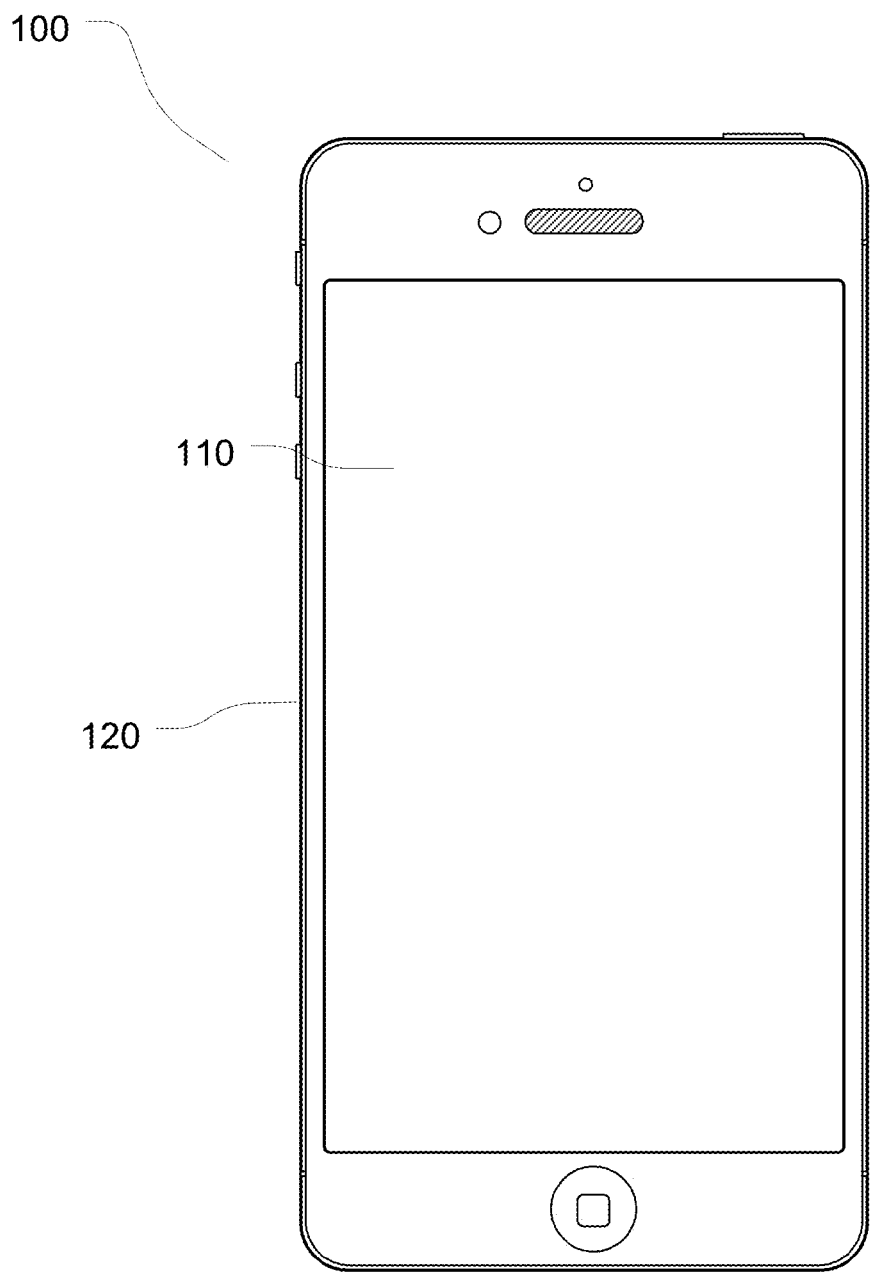
FIG. 1A is a front perspective view of an example force-sensitive computing device incorporating a force sensing device.

The following terminology is exemplary and is not intended to be limiting in any way.

The text "applied force" and variants thereof generally refer to a degree or measures of an amount of force being applied to the surface of a device. The degree or measure need not have any particular scale. For example, the measure of applied force may be linear, logarithmic, or otherwise nonlinear and can be adjusted periodically or aperiodically in response to one or more factors.

The text "surface flex" and variants thereof generally refers to any substantial amount of flex or other deformation of a device when force is applied to the surface of that device. As an example and without limitation, surface flex can include deformation of the cover glass element or other surface element of a device along with device elements positioned below the cover glass or other surface element.

The text "Bragg wavelength" and variants thereof generally refers to the Bragg reflection properties of a particular Bragg grating. As an example and without limitation, a Bragg wavelength may include a single reflected wavelength, generally centered at a known wavelength or frequency, and may be reflected in this example from a uniform Bragg grating. The term "Bragg wavelength" as used herein is not, however, limited to a single reflected wavelength centered at a known wavelength or frequency. For example, a Bragg wavelength may include multiple wavelengths reflected by a non-uniform Bragg grating (e.g. chirped grating).

Overview

This disclosure details various embodiments of a force-sensitive input element that may be used to detect one or more user force inputs to an input surface. The force-sensitive input element may be associated with a computing device or processor which may convert the sensed force inputs into force measurements. In some embodiments, the force-sensitive input element may be used to determine the force input to a track pad, a display screen, or other input surface for example one or more buttons of a keyboard or mobile electronic device. The force-sensitive input element may be positioned below an input surface which provides a contact surface for a user. For example, the input surface may be the cover glass for a display, the external surface of a touchpad, or the surface of one or more buttons. In other embodiments, the force-sensitive input element may be positioned below a display element, which in turn may be positioned below a user contact portion of the input surface (e.g. cover glass). In further embodiments, the force-sensitive input element may be disposed above, below or within the cover glass or the display during manufacturing. In further embodiments, the force-sensitive input element may be disposed on another layer between, above or below the input surface or a display element. Having the benefit of this disclosure, it may be appreciated that the force-sensitive input element may be positioned in any location suitable to receive user force input either from direct user contact or from indirect user contact through intermediate layers.

The force-sensitive input element may include one or more optical waveguides distributed across an input surface area suitable to receive user force input from, for example, a user's finger or a stylus. In certain embodiments, the input surface area may comprise a plane such as a display screen or trackpad, or in other embodiments the input surface may be three dimensional. The optical waveguides may be optically connected to one or more light sources. In an example embodiment, the light source may emit light into the optical waveguides either constantly, periodically, or aperiodically in the visible or near visible (e.g. infrared or ultraviolet) spectrums. The light source may be a superluminescent light emitting diode, or other similar light source, which emits a plurality of wavelengths of light simultaneously (i.e. white light). In other embodiments, the light source may be a spectrum sweeping light, such as a tunable laser, which may emit a plurality of wavelengths individually (i.e. a color changing light).

In some embodiments, the optical waveguides may form a pattern, for example a grid array. The number and distribution of waveguides across the input surface may depend on several factors including but not limited to the surface area of the force-sensitive input element and the degree of sensitivity desired.

Each optical waveguide may also include a plurality of periodically or aperiodically distributed Bragg gratings of different reflected Bragg wavelengths. Bragg grating sensors operate on the principle that a wavelength specific mirror (i.e. dielectric mirror) may be created with periodic modification of the effective refractive index within an optical waveguide. The specific reflected Bragg wavelength is dependent on the physical characteristics of the grating such that when changes in temperature, stress, or strain alter shape and size of the waveguide, the wavelength reflected by the grating measurably changes. The deviation from the expected reflected Bragg wavelength is proportional to the deviation in physical characteristics of the waveguide which in turn is proportional to changes in temperature, pressure, stress or strain applied to the waveguide.

In certain embodiments, the force-sensitive input element may include Bragg gratings of any suitable type (e.g. Type I, Type Ia, Type II, Type IIa, etc.). In certain other embodiments, the Bragg grating structure may be of any suitable type (e.g. uniform grating, chirped grating, tilted grating, etc.) The amount of variations of reflected Bragg wavelengths and the distribution between independent grating areas may depend on the a number of factors, including without limitation the degree of sensitivity required and the amount of physical space available between gratings.

The force-sensitive input element may also include one or more wavelength interrogators coupled to the one or more optical waveguides. The amount of force applied may be correlated with the difference between the actual wavelength reflected from a Bragg grating and the expected Bragg wavelength reflected from the Bragg grating when the grating is not under force. In certain embodiments, the one or more wavelength interrogators may determine a peak wavelength from of the actual wavelength reflected by methods known in the art. In certain embodiments, a single wavelength interrogator may receive multiple actual reflected wavelengths, i.e. an actually reflected spectrum. In this case, the one or more wavelength interrogators may determine multiple peak wavelengths from an actually reflected spectrum by methods known in the art. The one or more wavelength interrogators may also be configured to determine the characteristics of a reflected signal, for example, determining the starting frequency and the rate of frequency increase or decrease of a chirp signal by methods known in the art. The one or more wavelength interrogators may be of a size suitable for inclusion within the housing of a portable computing device, a trackpad device, or an input button or switch. The interrogator may also be coupled to a processor or other computing device, so that output from the interrogator may be interpreted into a force. In certain embodiments, the processor may be a microprocessor, a field-programmable gate array (FPGA), an application-specific integrated circuit (ASIC), or any other similarly capable circuitry known in the art.

In operation, as a force is applied to the input surface (e.g. due to a user pressing on the input surface), the input surface may undergo a certain amount of localized deformation in response to the force, or in other words the surface may experience a certain amount of surface flex localized at the point of user contact. In response to the surface flex, the force-sensitive input element may also experience a certain amount of localized deformation, placing the one or more portions of one or more optical waveguides under expansive or compressive strain. During the application of the force, light is emitted into the optical waveguide and reflected back to the interrogator only at the specific wavelengths of each Bragg grating along the length of the waveguide. Each Bragg grating which is localized at the point of user contact, having undergone expansive or compressive strain, reflects a different wavelength commensurate with the amount of force applied by the user. The interrogator then may return to the processor or computing device the received wavelengths. The processor may then determine, based on the deviation from expected reflected Bragg wavelengths, the amount of force applied and at which Bragg grating or gratings that force was applied.

In certain other embodiments, the interrogator or processor may adjust the actual reflected Bragg wavelengths as a function of ambient temperature change. In certain embodiments, the ambient temperature or a user's finger may cause the input surface and the force-sensitive input element to change temperature. A change in temperature may, as a function of the thermal expansion constants of the material of the input surface, waveguides, and surrounding materials (e.g. adhesives and housing components), cause either thermal expansion or thermal compression, which may alter the actual reflected Bragg wavelength. In certain embodiments the interrogator or processor may use information gathered from other sensors, for example a touch sensor (e.g. a capacitive or resistive touch sensor), or ambient temperature sensor, to calculate the predicted reflected Bragg wavelength shift as a result of temperature change. Once the predicted thermal shift is calculated, it may be subtracted from the received reflection made by the interrogator to negate the effects of temperature. The temperature-compensated reflected Bragg wavelength may then be used to calculate the strain in optical waveguide and thereby the force applied to the waveguide at each individual Bragg grating.

In certain other embodiments, the interrogator or processor may adjust the actual reflected Bragg wavelengths as a function of a uniform spectral shift as a result of ambient temperature change. In certain embodiments, a single optical waveguide may include multiple Bragg gratings, with different reflected Bragg wavelengths. In certain embodiments, the effect of ambient temperature may uniformly affect each Bragg grating along a single fiber, shifting each reflected Bragg wavelength a proportional amount. By determining the shift that each reflected Bragg wavelength exhibits from the expected Bragg wavelength, the effects of thermal expansion or compression of the optical waveguide may be determined and subtracted from each actual reflected Bragg wavelength. The temperature-compensated reflected Bragg wavelength may then be used to calculate the strain in optical waveguide and thereby the force applied to the waveguide at each individual Bragg grating.

In certain other embodiments, the interrogator or processor may adjust the actual reflected Bragg wavelengths as a function of a uniform spectral shift as a result of localized temperature change, for instance the temperature increase caused by a user's finger contacting the input surface for a period of time. In certain embodiments, a single optical waveguide may include multiple adjacent Bragg gratings, with different reflected Bragg wavelengths. In this embodiment, a single waveguide may, at a single location, reflect two different Bragg wavelengths. The effect of local temperature may uniformly affect each adjacent Bragg grating at a particular location, shifting each adjacent reflected Bragg wavelength a proportional amount due to localized temperature. By determining the shift that each adjacent reflected Bragg wavelength exhibits from the expected adjacent Bragg wavelengths, the effects of localized thermal expansion or compression may be determined and subtracted from each actual reflected Bragg wavelength. The localized temperature-compensated reflected Bragg wavelength may then be used to calculate the strain in optical waveguide and thereby the force applied to the waveguide at individual adjacent Bragg gratings.

In certain other embodiments, the interrogator or processor may adjust the actual reflected Bragg wavelengths as a function of past temperature change. In certain embodiments, a user's finger may cause the input surface and the force-sensitive input element to change temperature. Once the user's finger is removed, the localized temperature increase may not decrease immediately due to thermal hysteresis. Or for another example, if ambient temperature changes rapidly the entire force-sensitive input element may not change temperature immediately. As previously noted, temperature change may cause either thermal expansion or thermal compression, which may alter the actual reflected Bragg wavelength. In certain embodiments the interrogator or processor may use information gathered from other sensors, as well as previous local temperature information, to calculate the predicted reflected Bragg wavelength shift as a result of temperature change. Once the predicted thermal shift is calculated, it may be subtracted from the actual reflected Bragg wavelength determined by the interrogator to negate the effects of thermal hysteresis. The temperature-compensated reflected Bragg wavelength may then be used to calculate the strain in optical waveguide and thereby the force applied to the waveguide at each individual Bragg grating.

In certain other embodiments, the interrogator or processor may adjust the actual reflected Bragg wavelengths as a function of varying force resistivity across the area of the force-sensitive input element. In certain embodiments, the force-sensitive input element may be mounted in a portable computing device along with other electronic and structural components. The positioning of the other components may not be uniform, and may provide different resistance when confronted with a force. Furthermore, the force-sensitive input element may be more resistive to forces applied proximal to mounting points than it is to forces applied distal to mounting points. Accordingly, in certain embodiments, the interrogator or processor may adjust the calculated force based on the known physical layout, structural properties, and force response of the device in which the force-sensitive input element is mounted by associating a particular location across the area of the force-sensitive input element with a localized force resistance coefficient. Once the localized relative force resistance is determined, it may be applied by the interrogator or processor to negate the effects variances in force resistance across the force-sensitive input element.

FIG. 1A is a front perspective view of an example force-sensitive computing device 100 incorporating a force sensing device. The computing device 100 may include input surface 110. In FIG. 1, the force-sensing element is obscured behind input surface 110. The computing device 100 may also include an enclosure frame 120. The enclosure frame 120 may extend around the perimeter of input surface 110. In this embodiment, force sensing input element may detect forces through user contact with input surface 110. The force-sensitive computing device 100 may in other embodiments be a tablet computer, touchpad device, notebook or laptop computer display or touchpad, desktop computer display or touchpad, a media player, a gaming device or controller, a smart watch, or any other type of input button or other input device.

Figure 1B:
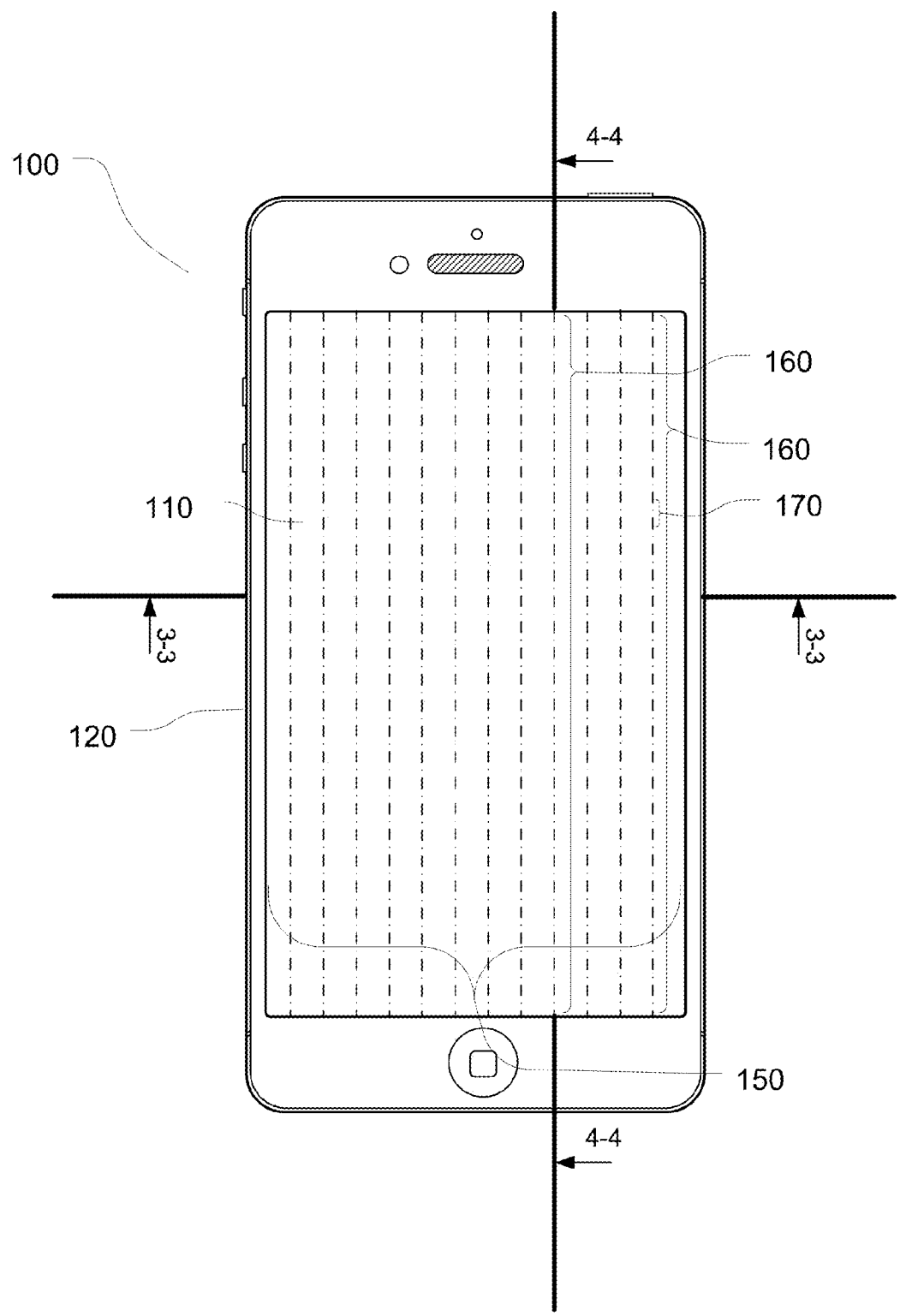
FIG. 1B is a front perspective view of an example force-sensitive computing device incorporating a force sensing device, showing a waveguide based force sensor aligned in a vertical direction.

FIG. 1B is a front perspective view of an example force-sensitive computing device 100, similar to the embodiment as shown in FIG. 1, incorporating a force-sensing input element 150, positioned behind input surface 110. The computing device 100 may also include an enclosure frame 120. The force-sensing input element 150 may include a series of parallel vertical waveguides 160. In the embodiment shown in FIG. 1B, there are twelve independent waveguides 160 illustrated, although it may be appreciated that the number of waveguides 160 may be increased or decreased depending on the particular requirements of various embodiments. Also visible along the length of each waveguide 160 are a plurality of Bragg gratings 170. There are twenty-seven Bragg gratings 170 shown in each of the twelve waveguides 160, although it may be appreciated that the number of Bragg gratings 170 may be increased or decreased depending on the particular requirements of various embodiments.

In certain embodiments, such as that shown in FIG. 1B, a display (not shown) may be positioned behind the force-sensitive input element 150. In these circumstances, in which the force-sensitive input element 150 is positioned behind a input surface 110, but in front of a display, it may be appreciated that a preferred width of optical waveguide 160 is a width near or less than the unassisted resolution of the human eye, such that the optical waveguide does not substantially interfere with visibility of the display.

Figure 2:
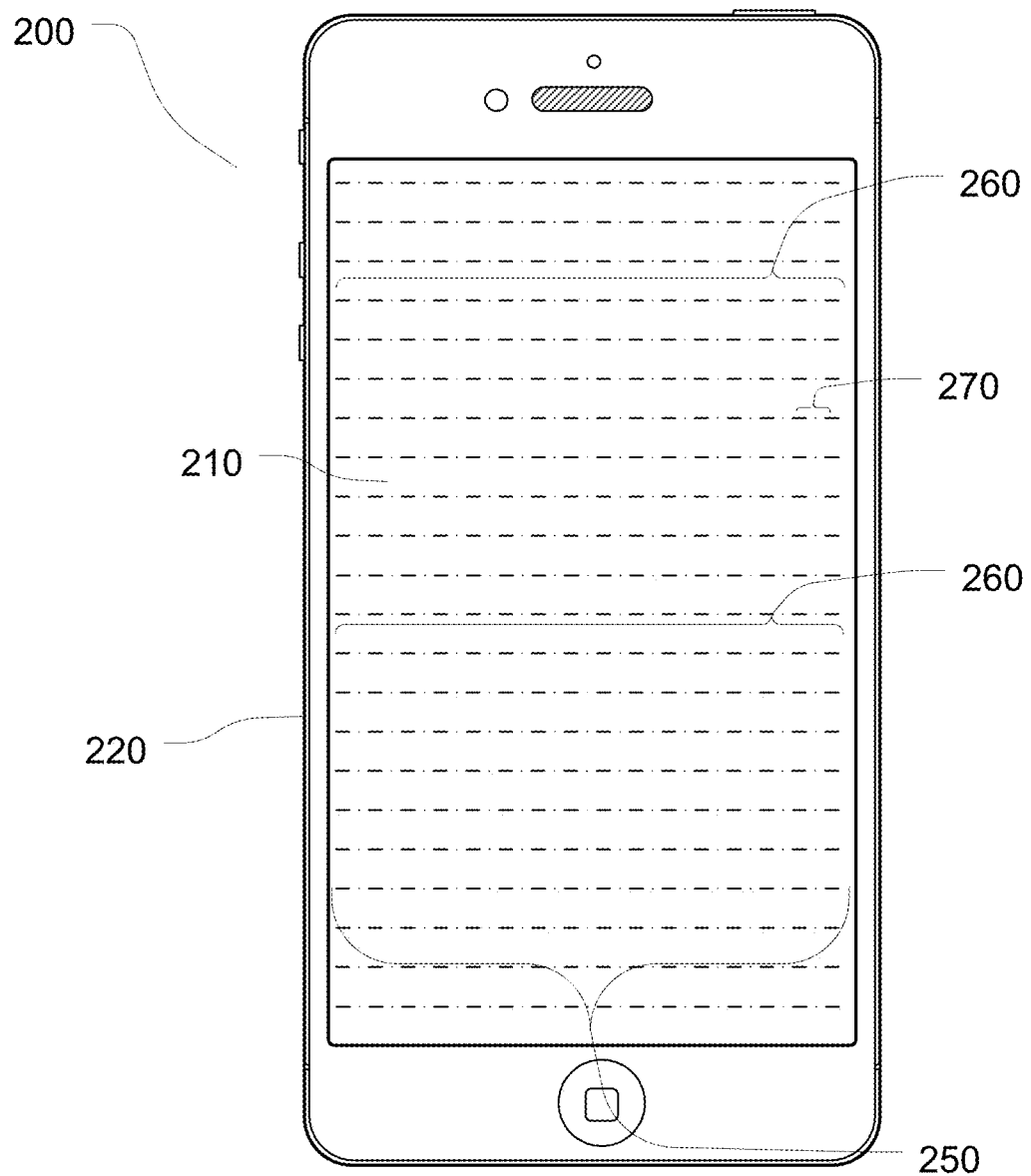
FIG. 2 is a front perspective view of an example force-sensitive computing device incorporating a force sensing device, showing a waveguide based force sensor aligned in a horizontal direction.

FIG. 2 is a front perspective view of an example force-sensitive computing device 200, similar to the embodiment as shown in FIG. 1A and FIG. 1B, incorporating a force-sensing input element 250 in a horizontal direction, positioned behind input surface 210. The computing device 200 may also include an enclosure frame 220. The force-sensing input element 250 may include a series of parallel waveguides 260. In the embodiment shown in FIG. 2, there are twenty-two independent waveguides 260 illustrated, although it may be appreciated that the number of waveguides 260 may be increased or decreased depending on the particular requirements of various potential embodiments. Also visible along the length of each waveguide 260 are a plurality of Bragg gratings 270. There are twenty-seven Bragg gratings 270 shown in each of the twelve waveguides 260, although it may be appreciated that the number of Bragg gratings 270 may be increased or decreased depending on the particular requirements of various embodiments.

Figure 3A:
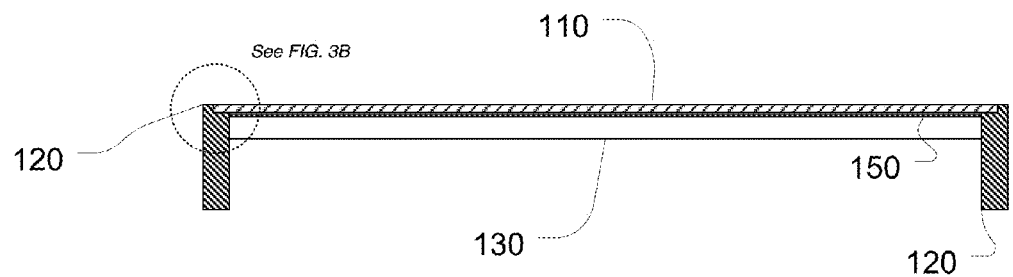
FIG. 3A is a simplified cross section view of the force-sensitive computing device shown in FIG. 1B taken along line 3-3.

FIG. 3A is a simplified horizontal cross section view of the force-sensitive computing device shown in FIG. 1B taken along line 3-3. Shown in this horizontal cross section are the input surface 110 positioned above the force-sensing input element 150 which in turn is positioned above display element 130. Along the edges of the simplified horizontal cross section view is shown enclosure frame 120.

Figure 3B:
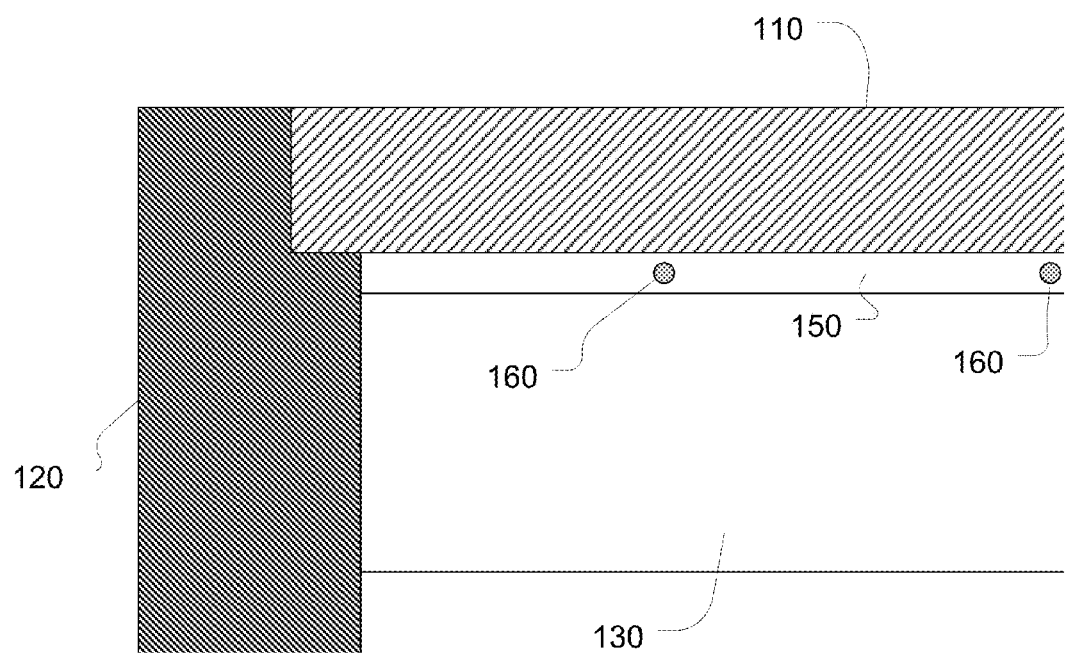
FIG. 3B is a detailed view of the simplified cross section shown in FIG. 3A.

FIG. 3B is a detailed view of one side of the simplified horizontal cross section shown in FIG. 3A. Shown in this detailed horizontal cross section are the input surface 110 positioned above the force-sensing input element 150 which in turn is positioned above display element 130, the layers surrounded by enclosure frame 120. In detailed view, two individual cross sections of waveguides 160 are visible.

Figure 4A:
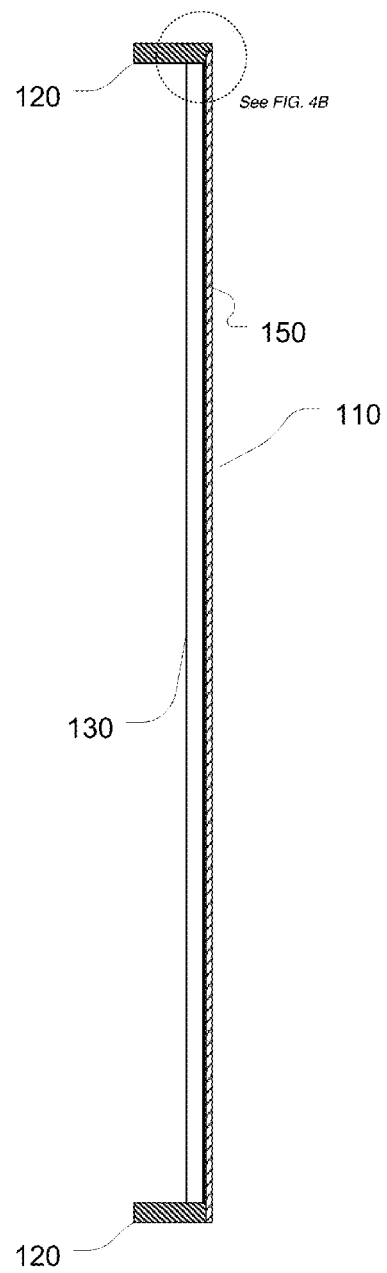
FIG. 4A is a simplified cross section view of the force-sensitive computing device shown in FIG. 1B taken along line 4-4.

FIG. 4A is a simplified vertical cross section view of the force-sensitive computing device shown in FIG. 1B taken along line 4-4. Shown in this vertical cross section is the input surface 110 positioned above the force-sensing input element 150 which in turn is positioned above display element 130. Along the edges of the simplified vertical cross section view is shown enclosure frame 120.

Figure 4B:
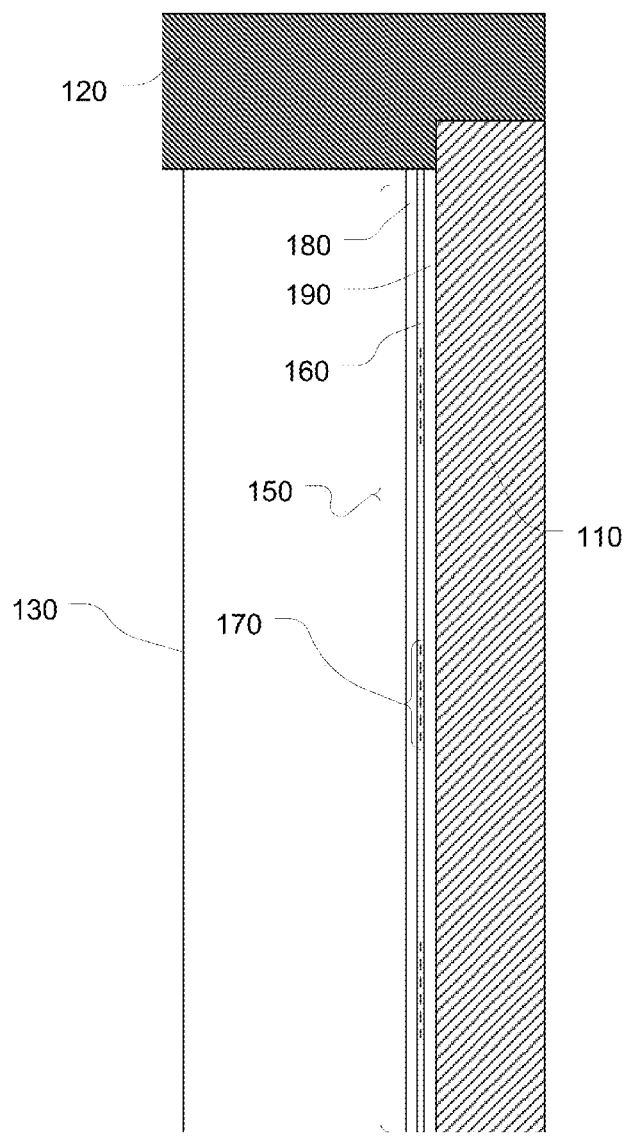
FIG. 4B is a detailed view of the simplified cross section shown in FIG. 4A.

FIG. 4B is a detailed view of one side of the simplified vertical cross section shown in FIG. 4A. Shown in this detailed horizontal cross section are the input surface 110 positioned above the force-sensing input element 150 which in turn is positioned above display element 130, the layers surrounded by enclosure frame 120. In a detailed view, a single individual cross sections of waveguide 160 is visible. At three locations along the cross section of waveguide 160 are shown Bragg gratings 170. Also shown in FIG. 4B are couplings 180 and 190. Coupling 190 mechanically connects force-sensitive input element 150 to the input surface 110, whereas coupling 180 mechanically connects force-sensitive input element 150 to the display 130. The couplings may be made of any suitable material, but in an example embodiment each coupling is a substantially transparent adhesive.

It may be appreciated that the couplings 180 and 190 in certain embodiments can be substantially transparent to allow light from the display 130 to penetrate both couplings and the input surface 110. In certain other embodiments, the couplings 180 and 190 may not necessarily be transparent, for instance if the force-sensitive input element is positioned below the display 130, or in another example embodiment without need for transparency, such as a trackpad input device. It may also be understood that in certain embodiments only a single coupling may be necessary to mechanically couple an input surface to the force-sensitive input element.

In still further embodiments, the optical waveguides of the force-sensitive input element may be formed as a part of a planar light circuit (PLC) etched as a surface feature of the input surface 110 or display 130.

Figure 5:
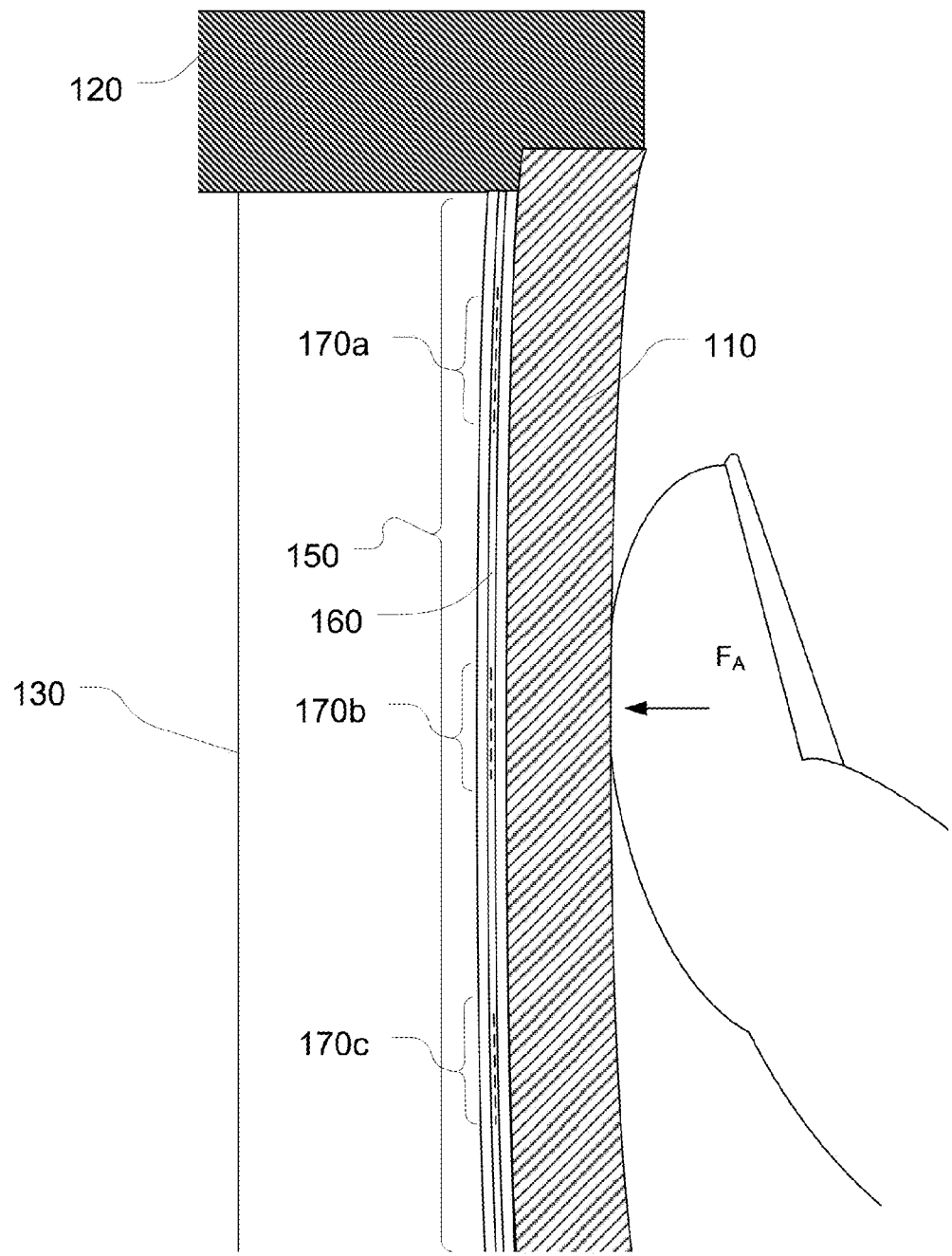
FIG. 5 illustrates an exaggerated deformation of surface of the force-sensitive computing device as a result of a user touch counterpart to the detailed cross section view as shown in FIG. 4B.

FIG. 5 illustrates a detailed and exaggerated deformation of an input surface of the force-sensitive computing device as a result of a user touch counterpart to the detailed cross section view as shown in FIG. 4B. Shown in this detailed horizontal cross section are the input surface 110 positioned above the force-sensing input element 150 which in turn is positioned above display element 130, the layers surrounded by enclosure frame 120. In detailed view, a single individual cross section of waveguide 160 is visible. At three locations along the cross section of waveguide 160 are shown Bragg gratings 170a, 170b, and 170c. Also illustrated is a user's finger engaging the input surface 110 with a downward applied force, $F_A$. The applied force causes a distributed deformation of input surface 110, shown in FIG. 5 with exaggeration. It may be appreciated that in operation, the deformation of input surface 110 may not be perceivable under normal circumstances. As shown, the deformation of input element 110 causes the force-sensitive input element 150 to also deform along a similarly distributed curvature. One may appreciate that the deformation may not necessarily be curved in that it may either be more localized or distributed depending on the elastic deformation properties of the materials of the input surface 110, display 130, and force-sensitive input element 150, among other components. Also illustrated in FIG. 5 is that the deformation of force-sensitive input element 150 deforms waveguide 160, and similarly deforms Bragg gratings 170a, 170b, and 170c. As shown Bragg gratings 170a, 170b, and 170c experience different amounts of deformation. In the illustrated embodiment, element 170b is perpendicular to the applied force $F_A$, so the compressive force on waveguide 160 at Bragg grating 170b can be greater. One will appreciate that at 170a and 170c, compressive forces can be less than that at 170b.

Figure 6A:
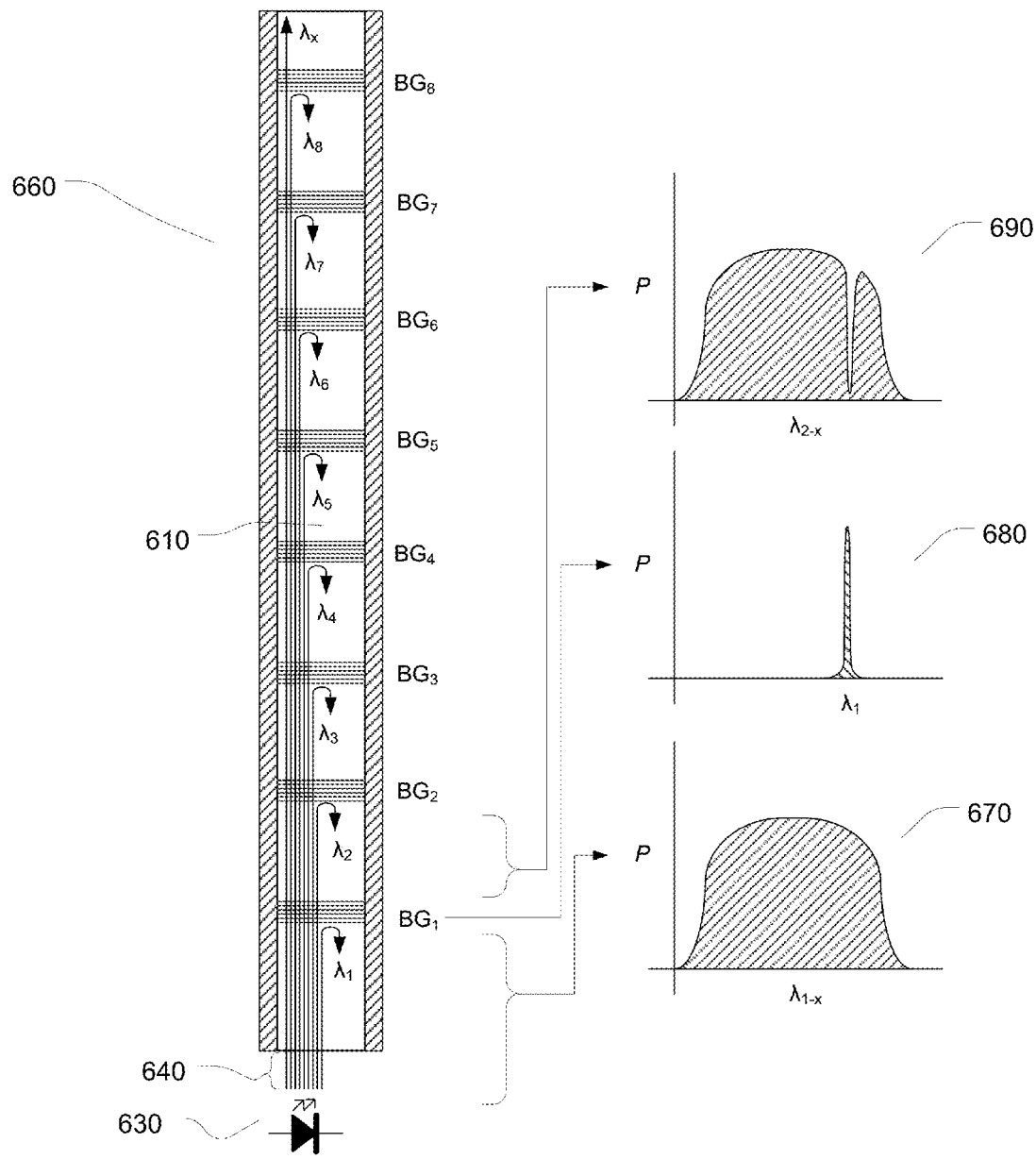
FIG. 6A is an enlarged-scale cross section of a single waveguide including multiple independent Bragg gratings.

FIG. 6A is an enlarged-scale cross section of a single waveguide including multiple independent Bragg gratings. Shown in FIG. 6A are eight independent Bragg gratings, $BG_{1-8}$, which are present in fiber core 610, which is the central portion of optical waveguide 660. Optically coupled to waveguide 660 is light source 630. Light source 630 may be a light source configured to emit light 640 (for illustrative purposes light 640 is shown divided over various bands) of any suitable band width. The light source 630 may be a superluminescent light emitting diode, or other similar light source, which emits a plurality of wavelengths of light simultaneously (i.e. white light). In other embodiments, the light source 630 may be a spectrum sweeping light, such as a tunable laser, emitting plurality of wavelengths individually (i.e. a color changing light).

As shown in FIG. 6A, each of the Bragg gratings, $BG_{1-8}$, reflects a different expected reflected Bragg wavelength $\lambda_{1-8}$ respectively. It should be further noted that each Bragg grating $BG_{1-8}$ transmits all other frequencies through it. By way of example, Bragg grating $BG_1$ reflects only wavelength $\lambda_1$, while transmitting (i.e. is transparent to) wavelengths $\lambda_{2-8}$. In some embodiments, all Bragg gratings $BG_{1-8}$ can be transparent to wavelength $\lambda_x$.

As shown in FIG. 6A, light emitted from light source 630 may be broad-band light, such as that shown in chart 670, illustrating that light emitted from light source 630 includes wavelengths $\lambda_{1-x}$ transmitted at power P. As light moves through Bragg grating $BG_1$, only the wavelength $\lambda_1$ is reflected at power P, as shown in chart 680. As light moves on to Bragg grating $BG_2$, all light that was not reflected by $BG_1$ is transmitted, as shown in chart 690, illustrating that light transmitted through $BG_1$ includes wavelengths $\lambda_{2-x}$ transmitted at power P.

Figure 6B:
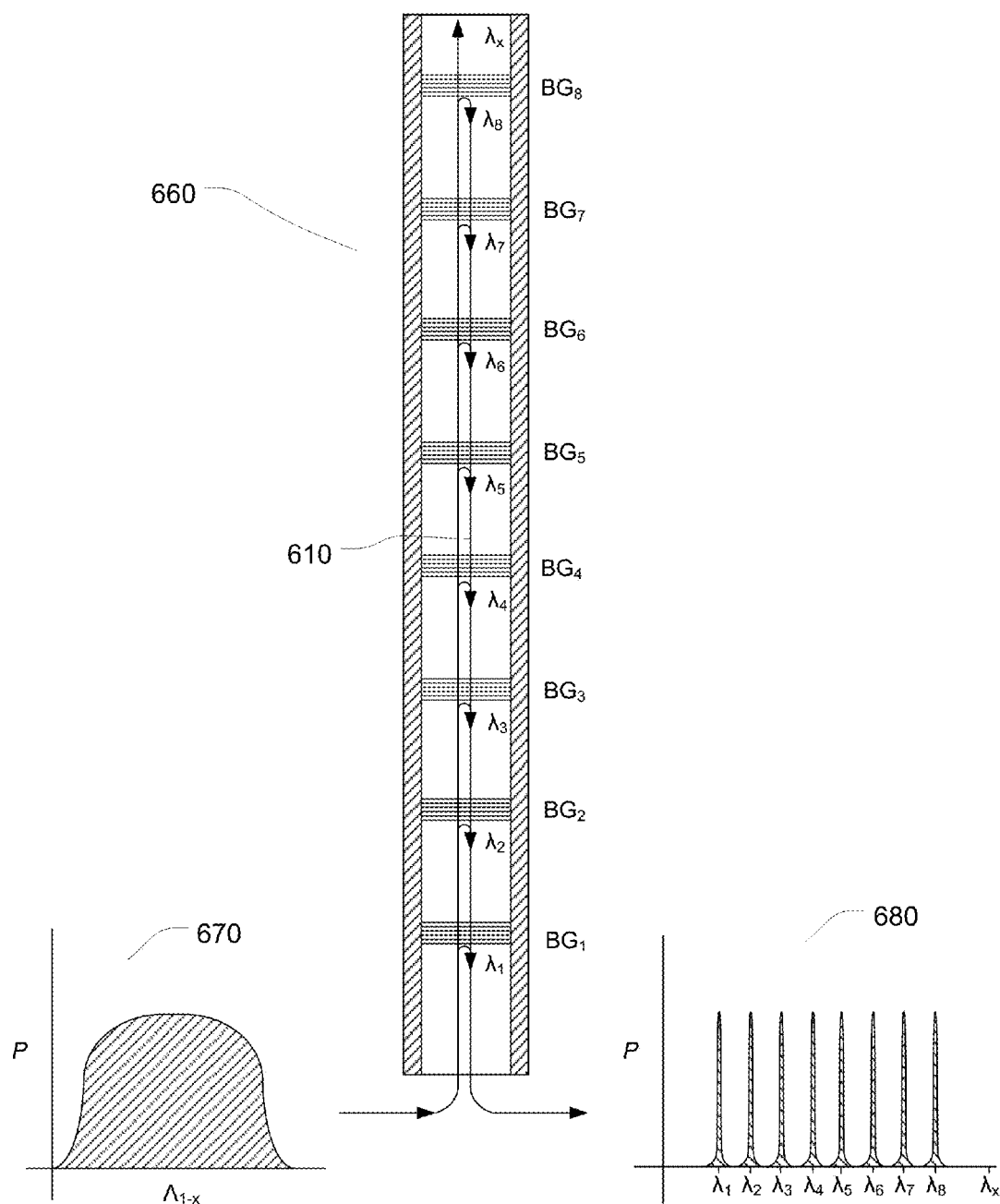
FIG. 6B is an enlarged-scale cross section of a single waveguide including multiple independent Bragg gratings.

FIG. 6B is an enlarged-scale cross section of a single waveguide including multiple independent Bragg gratings. FIG. 6B shows a similar embodiment as shown in FIG. 6A. Illustrated by chart 670, broad-band light at wavelengths $\lambda_{1-x}$ is emitted at power P into waveguide 660. Each Bragg grating $BG_{1-8}$ reflects a different Bragg wavelength $\lambda_{1-8}$ back through the waveguide, as shown in chart 680. It is important to note that the actual reflected Bragg wavelengths will also transmit back through other Bragg gratings. For example, Bragg grating $BG_1$ will allow reflected wavelengths $\lambda_{2-8}$ through. It is also important to note that because none of the Bragg gratings $BG_{1-8}$ reflect the wavelength $\lambda_x$, that wavelength will not be reflected (or, rather, it will be reflected at zero power) as shown in chart 680.

One may appreciate that each wavelength may differ to a certain degree so that there is no interference with measurements between gratings. In some embodiments the Bragg wavelengths may overlap as they shift in response to changes in temperature or stress or strain.

In certain embodiments, the minimum variation between expected reflected Bragg wavelengths of multiple Bragg gratings along a single optical waveguide may be determined by calculating the maximum variation in temperature under normal operating conditions of the force-sensitive input element and by calculating the maximum variation in stress or strain possible under normal operating conditions of the force-sensitive input element. For example, in an optical waveguide having multiple Bragg gratings, if it is determined that the maximum operating temperature of the waveguide may independently cause the actual reflected Bragg wavelength to change by 10% when no force is present, and if it is determined that the maximum possible force applied the waveguide may independently cause the actual reflected Bragg wavelength to change by 5% when at optimal operating temperature, and it is further determined that if these events occur simultaneously, the actual reflected Bragg wavelength may change by 12%, then the multiple Bragg gratings $BG_{1-8}$ may be structured to have expected reflected Bragg wavelengths separated (i.e. minimum variation) by at least 12% (as this is the largest possible calculated variation) so as to not overlap with actual reflected Bragg wavelengths of other Bragg gratings. Note that these variations are provided only as illustrations and are not to be construed as experimentally derived values. In other embodiments, it may be that the force-sensitive input element which contains the optical waveguides has different maximum operating temperature or different maximum force resistance. In this case, the calculation of minimum variation may change. In still further embodiments, the device which contains the force-sensitive input may have different maximum operating conditions, which again may change the calculation of minimum variation between Bragg gratings.

Figure 7:
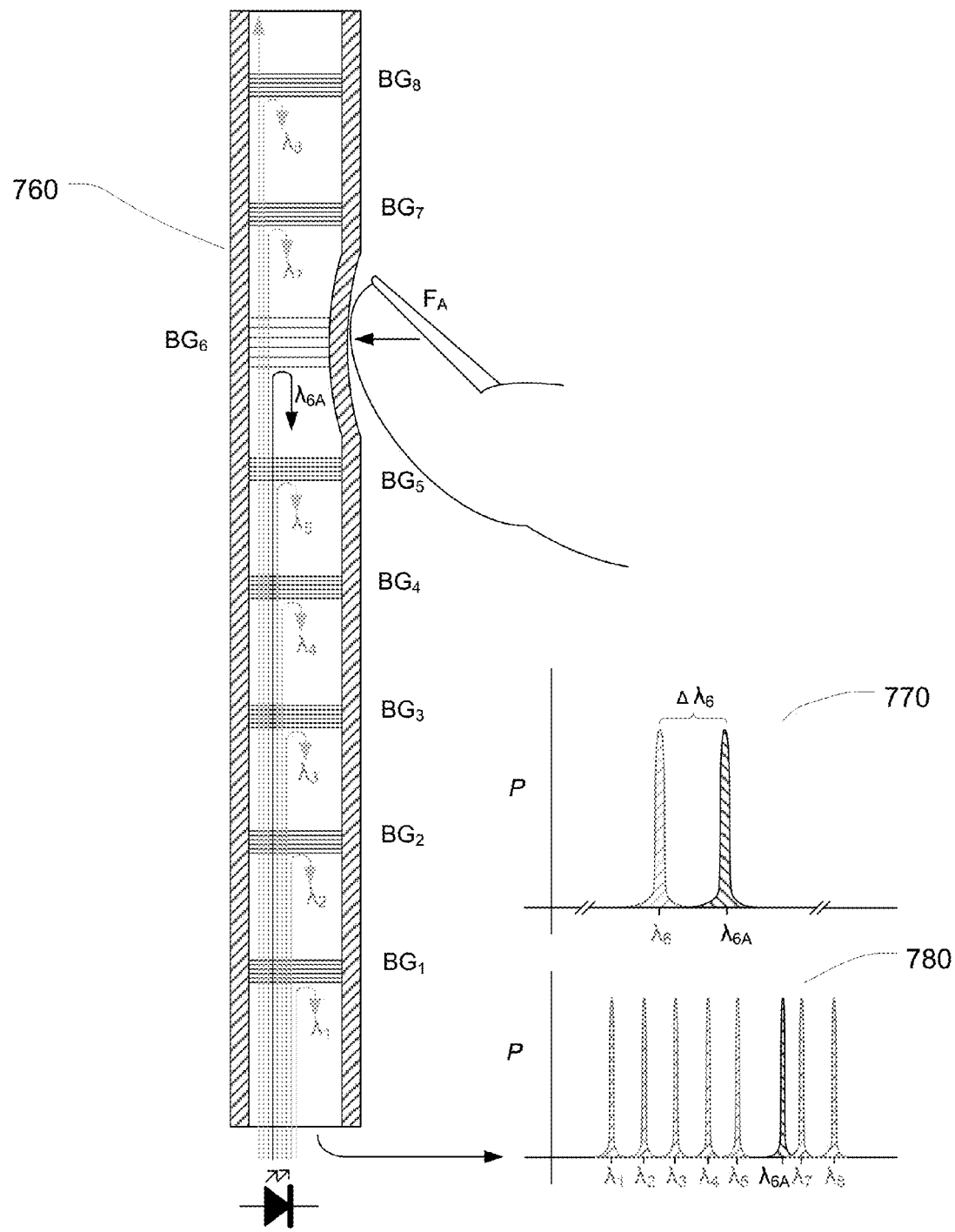
FIG. 7 illustrates the cross section of an exaggerated deformation of a single Bragg grating within the enlarged-scale waveguide as shown in FIG. 6 as a result of a single user touch.

FIG. 7 illustrates the cross section of an exaggerated deformation of a single Bragg grating within the enlarged-scale waveguide as shown in FIG. 6A as a result of a single user touch. Shown in FIG. 7 is a user's finger applying a downward force $F_A$ to optical waveguide 760 causing a distributed deformation of the optical waveguide 760 (which for illustrative purposes has been exaggerated). The illustrated deformation is localized at an area adjacent to Bragg grating $BG_6$, causing the corresponding actual reflected Bragg wavelength $\lambda_{6A}$ to change by a certain amount $\Delta\lambda_6$ from the expected reflected Bragg wavelength $\lambda_6$, as shown in chart 770. It is also relevant to note that no other Bragg grating is affected in the illustrated embodiment, and thus the actual reflected Bragg wavelengths $\lambda_{1-5}$ and $\lambda_{7-8}$ do not change, as shown in chart 780.

Figure 8:
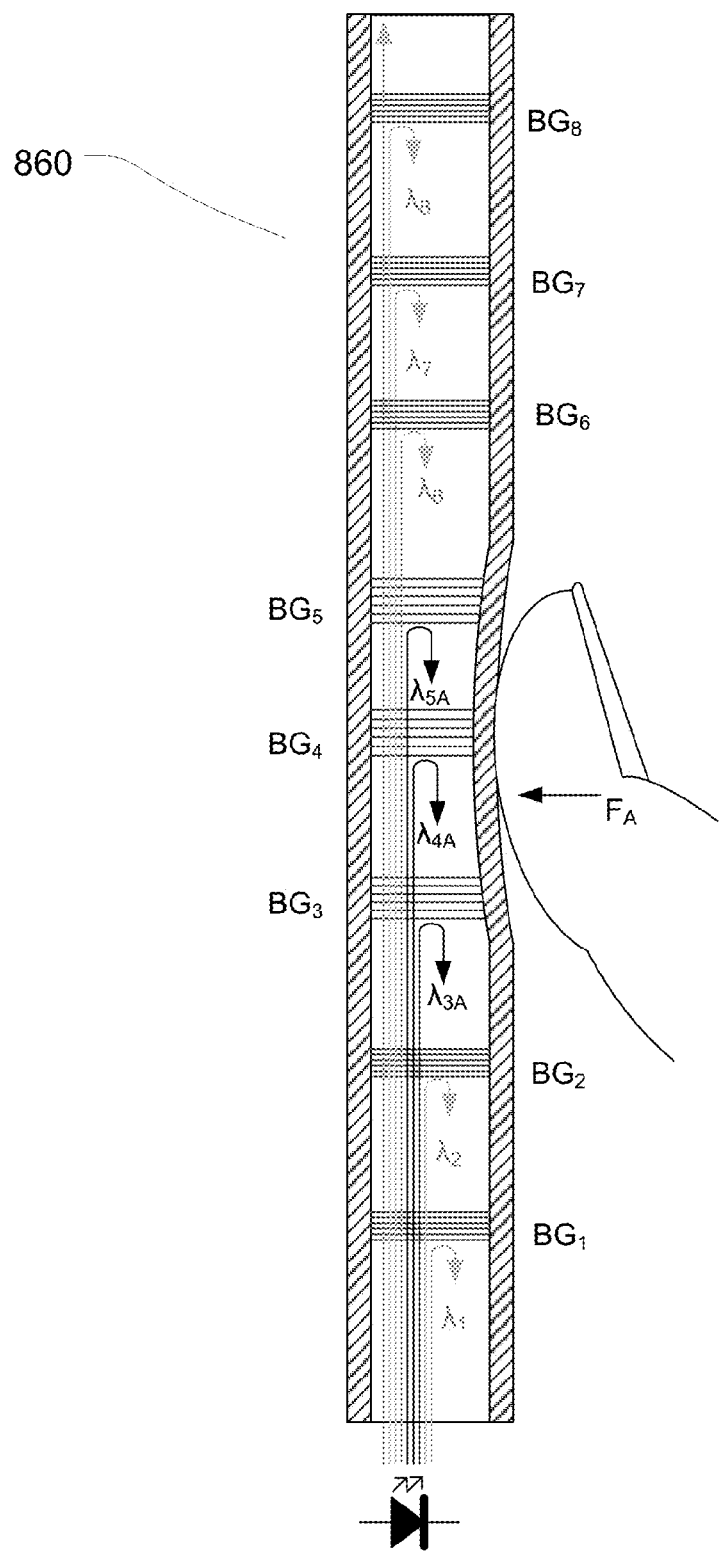
FIG. 8 illustrates the cross section of an exaggerated deformation of multiple Bragg gratings within the enlarged-scale waveguide as shown in FIG. 6 as a result of a single user touch.

FIG. 8 illustrates the cross section of an exaggerated deformation of multiple Bragg gratings within the enlarged-scale waveguide as shown in FIG. 6 as a result of a single user touch. As shown in FIG. 8, a user's finger applies a downward force $F_A$ to the optical waveguide 860 causing a distributed deformation of the optical waveguide 860 (which for illustrative purposes has been exaggerated). The illustrated deformation is wide area (i.e. for example as a result of a more forceful touch than shown in FIG. 7) localized at an area adjacent to three Bragg gratings $BG_{3-5}$, causing the corresponding three actual reflected Bragg wavelengths $\lambda_{3A-5A}$ to change. It is also relevant to note that no other grating is affected by the illustrated deformation, and thus the five reflected Bragg wavelengths $\lambda_{1-2}$ and $\lambda_{6-8}$ do not change.

Figure 9:
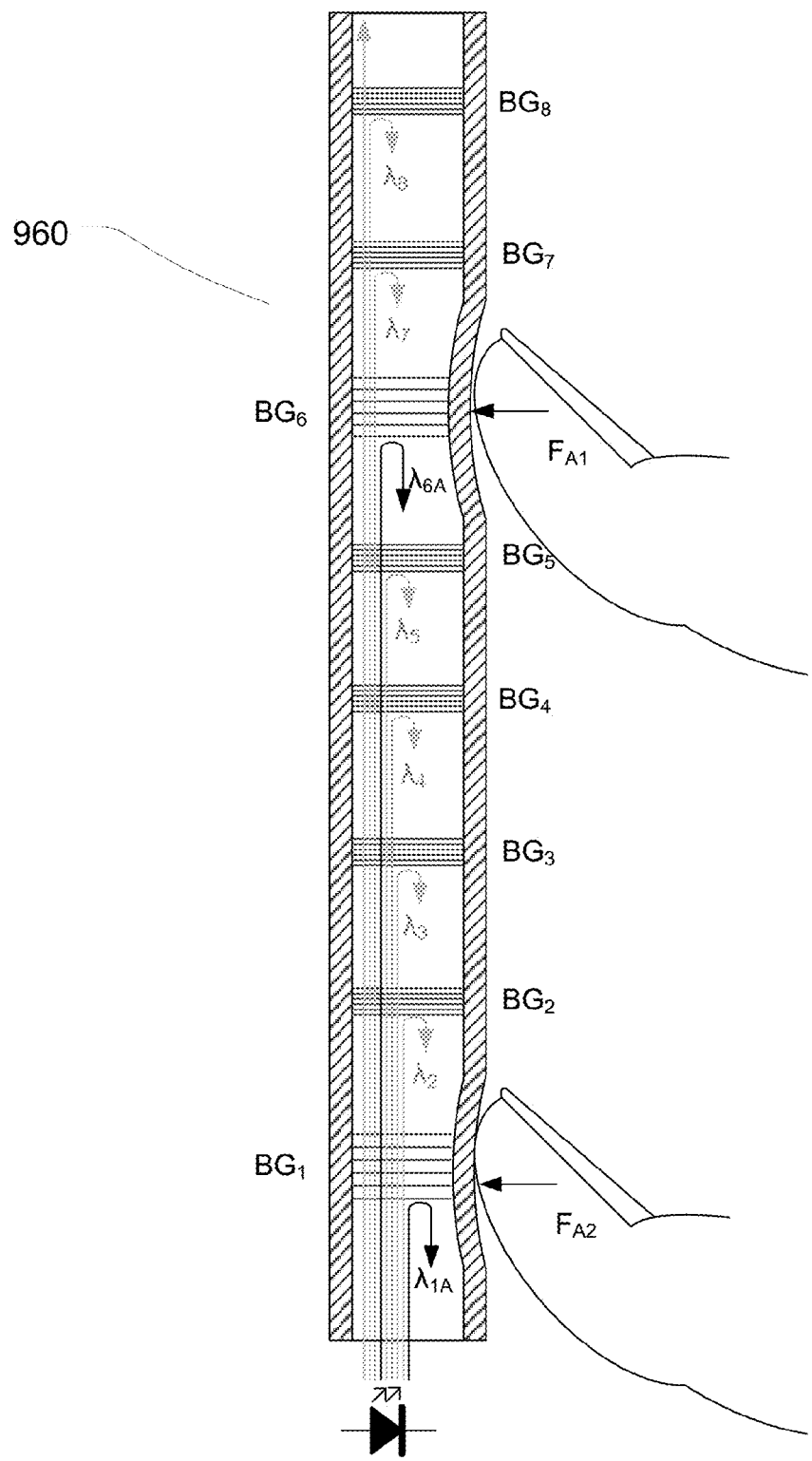
FIG. 9 illustrates the cross section of an exaggerated deformation of multiple Bragg gratings within the enlarged-scale waveguide as shown in FIG. 6 as a result of multiple user touches.

FIG. 9 illustrates the cross section of an exaggerated deformation of multiple Bragg gratings within the enlarged-scale waveguide as shown in FIG. 6 as a result of a single user touch. As shown in FIG. 9, a user's finger applies a first downward force $F_{A1}$ and a second downward force $F_{A2}$ to the optical waveguide 960 each applied force causing separate distributed deformations of the optical waveguide 960 (which for illustrative purposes has been exaggerated). The illustrated deformation is distributed but localized (i.e. for example as a result multiple touches). The illustrated deformation as a result of first downward force $F_{A1}$ is localized at an area adjacent to Bragg grating $BG_6$, causing the corresponding actual reflected Bragg wavelength $\lambda_{6A}$ to change. It is also relevant to note that in the illustrated embodiment no other grating is affected by the illustrated deformation as a result of first downward force $F_{A1}$, and thus the actual reflected Bragg wavelengths $\lambda_{1-5}$ and $\lambda_{7-8}$ do not change as a result of first downward force $F_{A1}$.

The illustrated deformation shown in FIG. 9 as a result of second downward force $F_{A2}$ is localized at an area adjacent to Bragg grating $BG_1$, causing the corresponding reflected Bragg wavelength $\lambda_{1A}$ to change. It is also relevant to note that in the illustrated embodiment no other grating is affected by the illustrated deformation as a result of second downward force $F_{A2}$, and thus the actual reflected Bragg wavelengths $\lambda_{2-8}$ do not change as a result of second downward force $F_{A2}$. It is important to note that FIG. 9 is not drawn to scale, as optical wave guide 960 may be in certain preferred embodiments not perceivable adjacent to a user finger. It is further important to note that the first downward force $F_{A1}$ and the second downward force $F_{A2}$ are independent of one another and that the forces applied may be equal or unequal.

Figure 10:
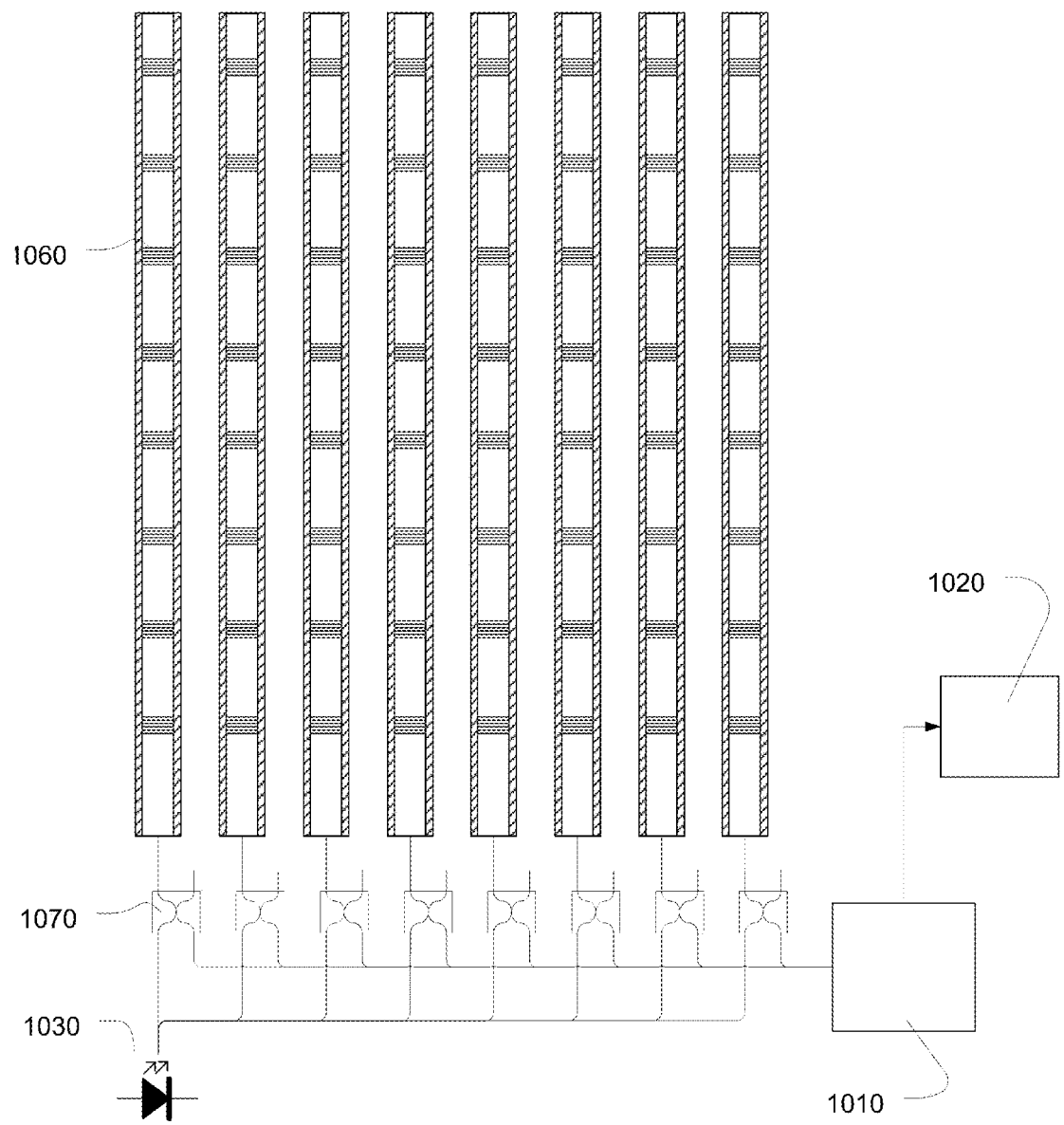
FIG. 10 illustrates one embodiment of the force-sensitive computing device showing multiple independent enlarged-scale waveguides coupled to a single light source and a single spectrum interrogator.

FIG. 10 illustrates one embodiment of the force-sensitive computing device showing multiple independent enlarged-scale waveguides 1060 connected via optical couplings 1070 to a single light source 1030 and a single spectrum interrogator 1010 which in turn is connected to processor 1020. In certain embodiments, the interrogator 1010 may receive Bragg reflection information from a single waveguide 1060 after one optical coupling 1070 is activated. In this way, the interrogator 1010 may sequentially interrogate each of the waveguides 1060. This embodiment allows independent waveguides 1060 to share certain Bragg reflection wavelengths, for example a first Bragg waveguide may have eight independent Bragg reflection wavelengths which will not overlap under normal operating conditions. Once the associated optical coupling 1070 is disabled (disconnecting first waveguide from the interrogator), a second optical coupling 1070 may be coupled to the interrogator having an identical Bragg reflection wavelength set. In certain other embodiments, the couplings 1070 may be passive in that they cannot be selectively activated or deactivated. In such an embodiment, each waveguide can have a completely independent set of Bragg reflection wavelengths from all other waveguides in the set. In any embodiment, once the interrogator 1010 has established what wavelengths have been reflected, it may pass the Bragg wavelength information on to the processor 1020 for further processing. In certain embodiments, the interrogator 1010 may operate continually, providing updates to the processor 1020 as changes to the wavelengths occur, or in other embodiments, the interrogator 1010 may operate periodically, only updating the processor at defined intervals. In further embodiments, the interrogator 1010 may only operate upon request of processor 1020.

Figure 11:
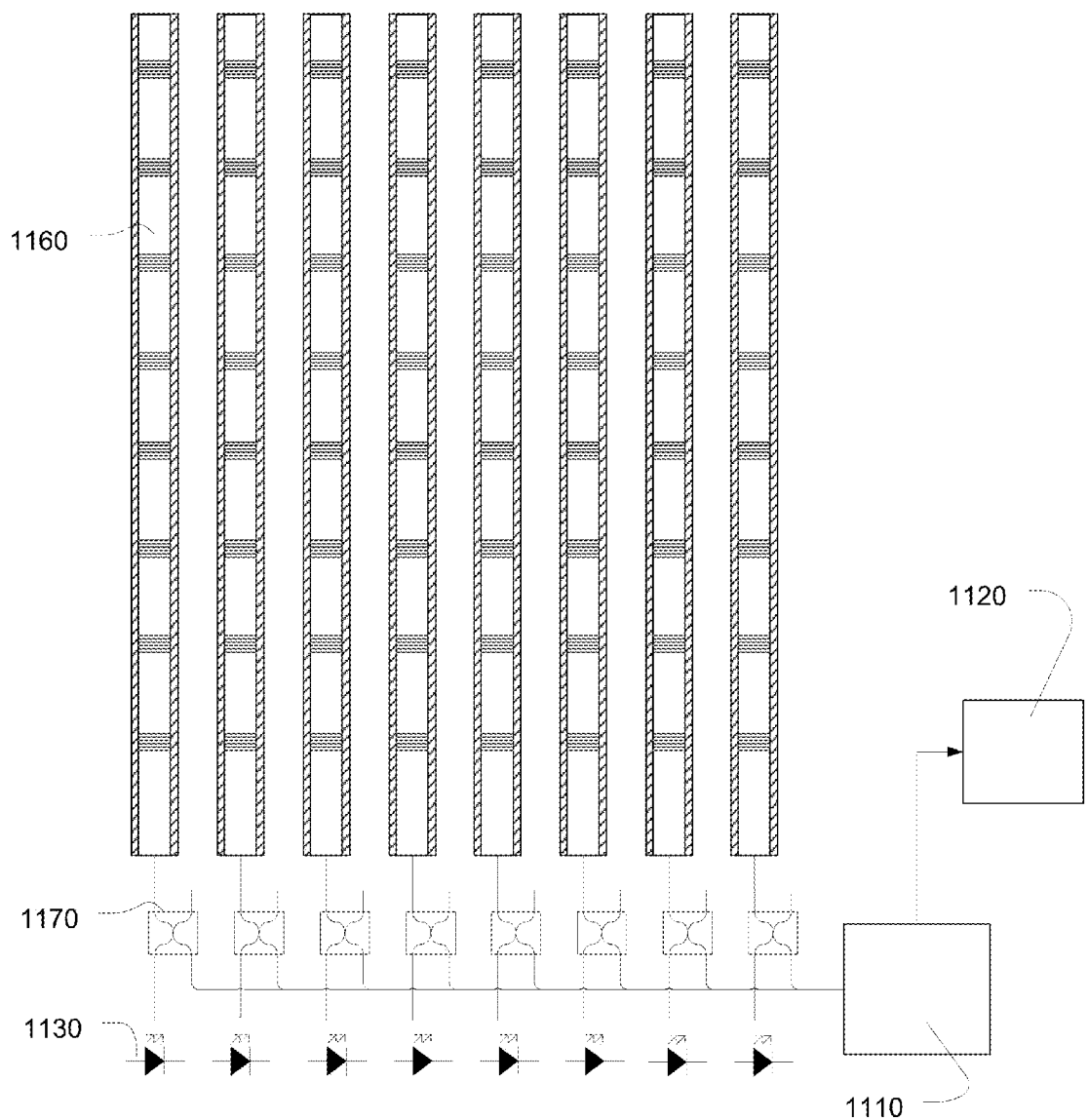
FIG. 11 illustrates an alternate embodiment of the force-sensitive computing device showing multiple independent enlarged-scale waveguides coupled to multiple light sources and a single spectrum interrogator.

FIG. 11 illustrates an alternate embodiment of the force-sensitive computing device showing multiple independent enlarged-scale waveguides 1160 connected via optical couplings 1170 to multiple light sources 1130 and a single spectrum interrogator 1110 which in turn is connected to processor 1120. As with the embodiments described above relating to FIG. 10, the embodiment illustrated in FIG. 11 may employ sequential interrogation or non-sequential interrogation of the several waveguides 1160. The interrogator 1110 may operate continually, periodically, or upon request. The multiple light sources 1130 may emit the same frequencies (i.e. each light source 1130 emitting substantially similar bands), or in certain other embodiments, different frequencies (i.e. each light source 1130 emitting different bands).

Figure 12:
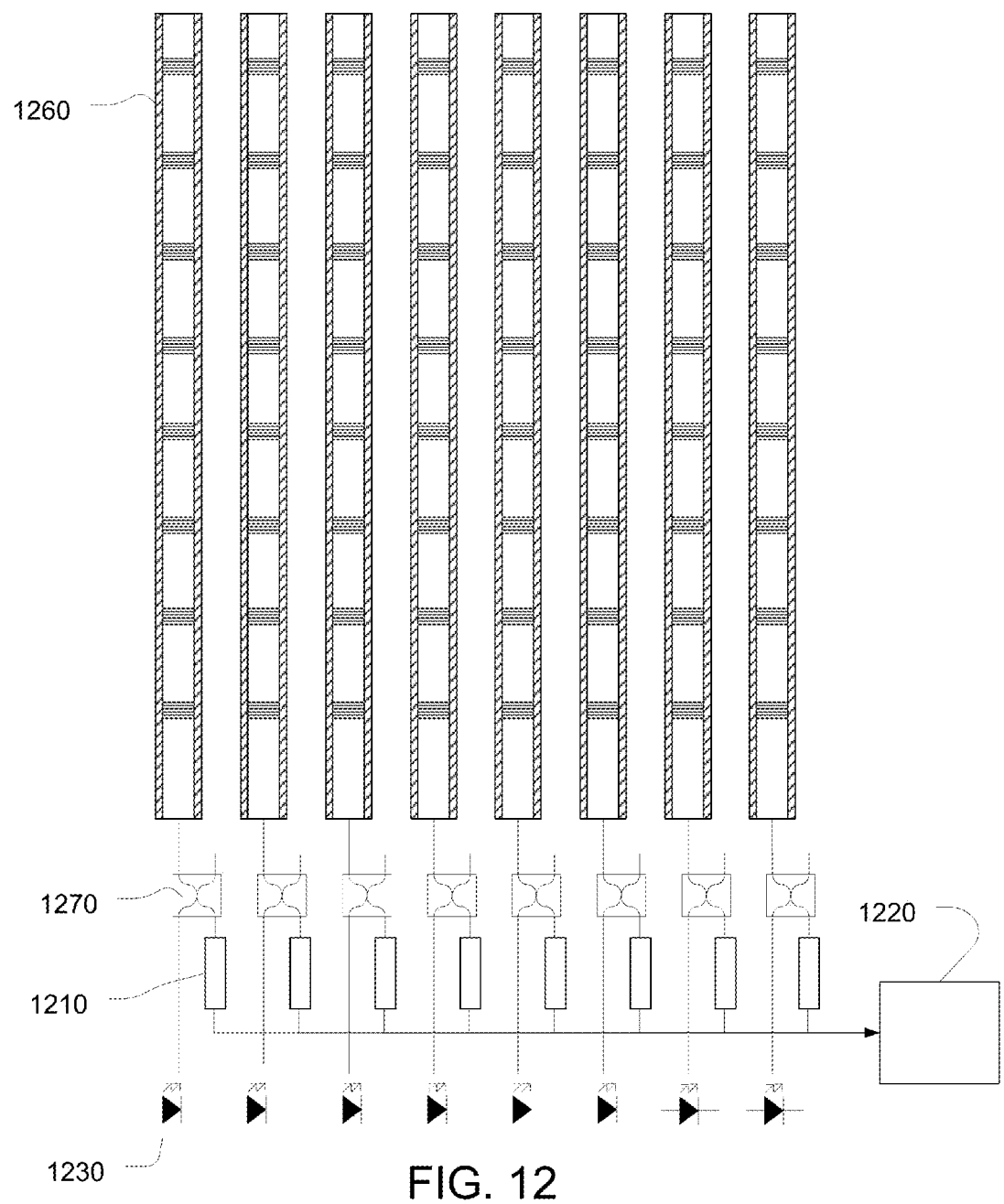
FIG. 12 illustrates an alternate embodiment of the force-sensitive computing device showing multiple independent enlarged-scale waveguides coupled to multiple light sources and multiple spectrum interrogators.

FIG. 12 illustrates an alternate embodiment of the force-sensitive computing device showing multiple independent enlarged-scale waveguides 1260 connected via optical couplings 1270 to multiple light sources 1230 also coupled to a multiple spectrum interrogators 1210 which in turn connect to processor 1220. As with the embodiments described above relating to FIG. 10, the interrogators 1210 may operate continually, periodically, or upon request.

Figure 13:
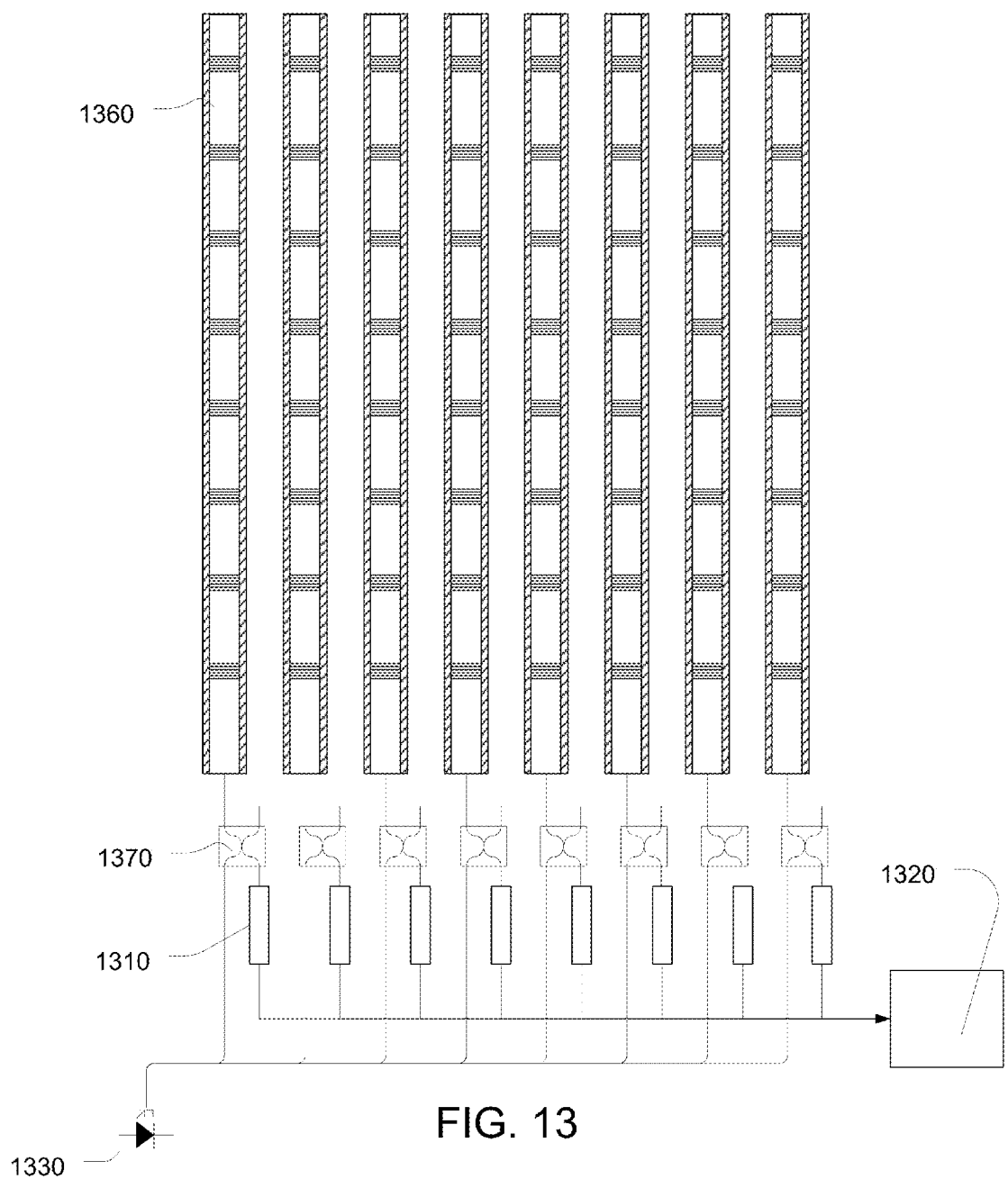
FIG. 13 illustrates an alternate embodiment of the force-sensitive computing device showing multiple independent enlarged-scale waveguides coupled to a single light sources and multiple spectrum interrogators.

FIG. 13 illustrates an alternate embodiment of the force-sensitive computing device showing multiple independent enlarged-scale waveguides 1360 connected via optical couplings 1370 to a single light source 1330 also coupled to multiple spectrum interrogators 1310 which in turn connect to processor 1320. As with the embodiments described above relating to FIG. 10, the interrogators 1310 may operate continually, periodically, or upon request.

Figure 14:
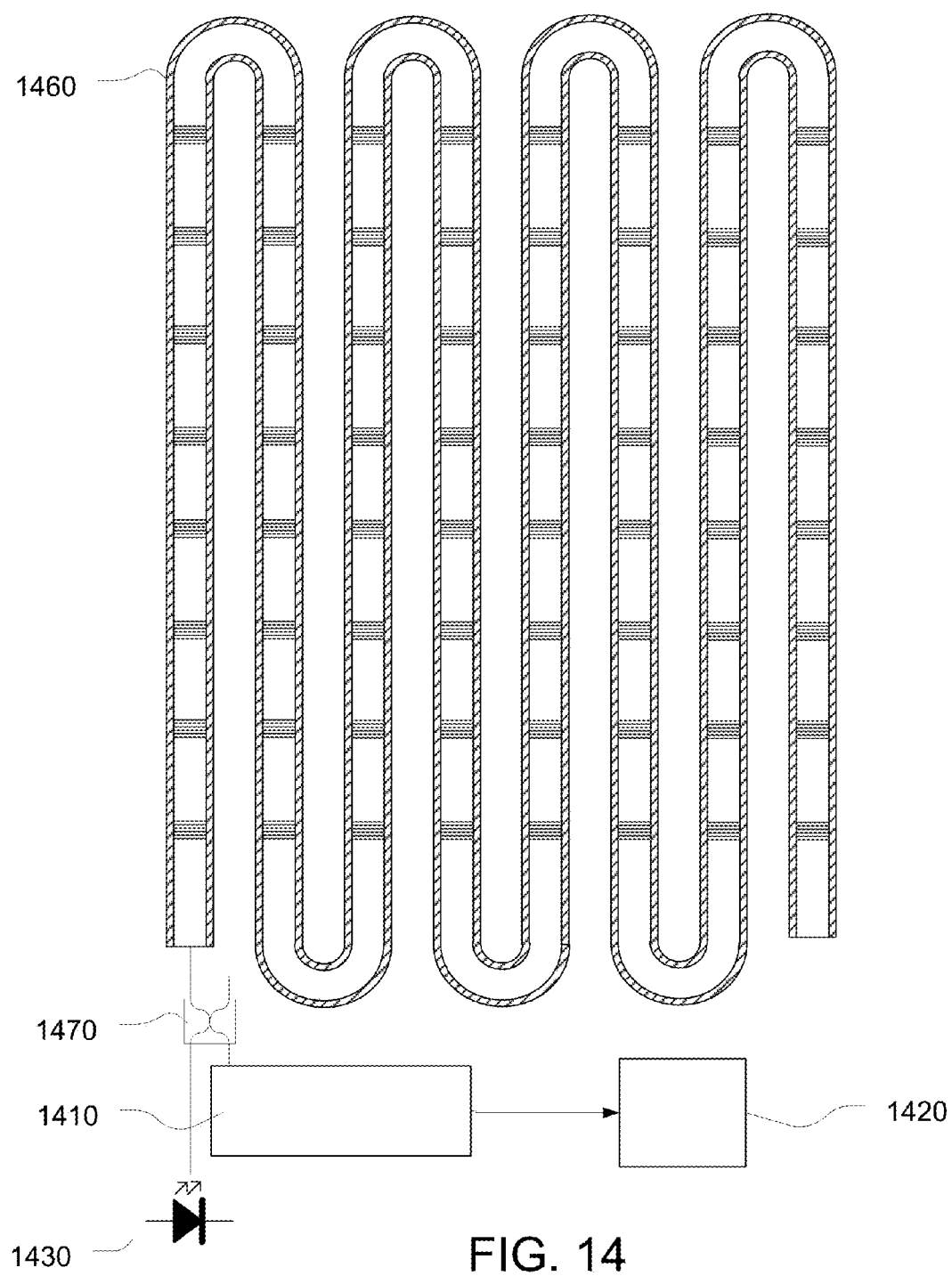
FIG. 14 illustrates an alternate embodiment of the force-sensitive computing device showing a single enlarged-scale waveguide coupled to a single light source and a single spectrum interrogator.

FIG. 14 illustrates an alternate embodiment of the force-sensitive computing device showing a single curved enlarged-scale waveguide 1460 connected via optical couplings 1470 to a single light source 1430 also coupled to a single spectrum interrogator 1410 which in turn connect to processor 1420. As with the embodiments described above relating to FIG. 10, the interrogator 1410 may operate continually, periodically, or upon request.

Figure 15:
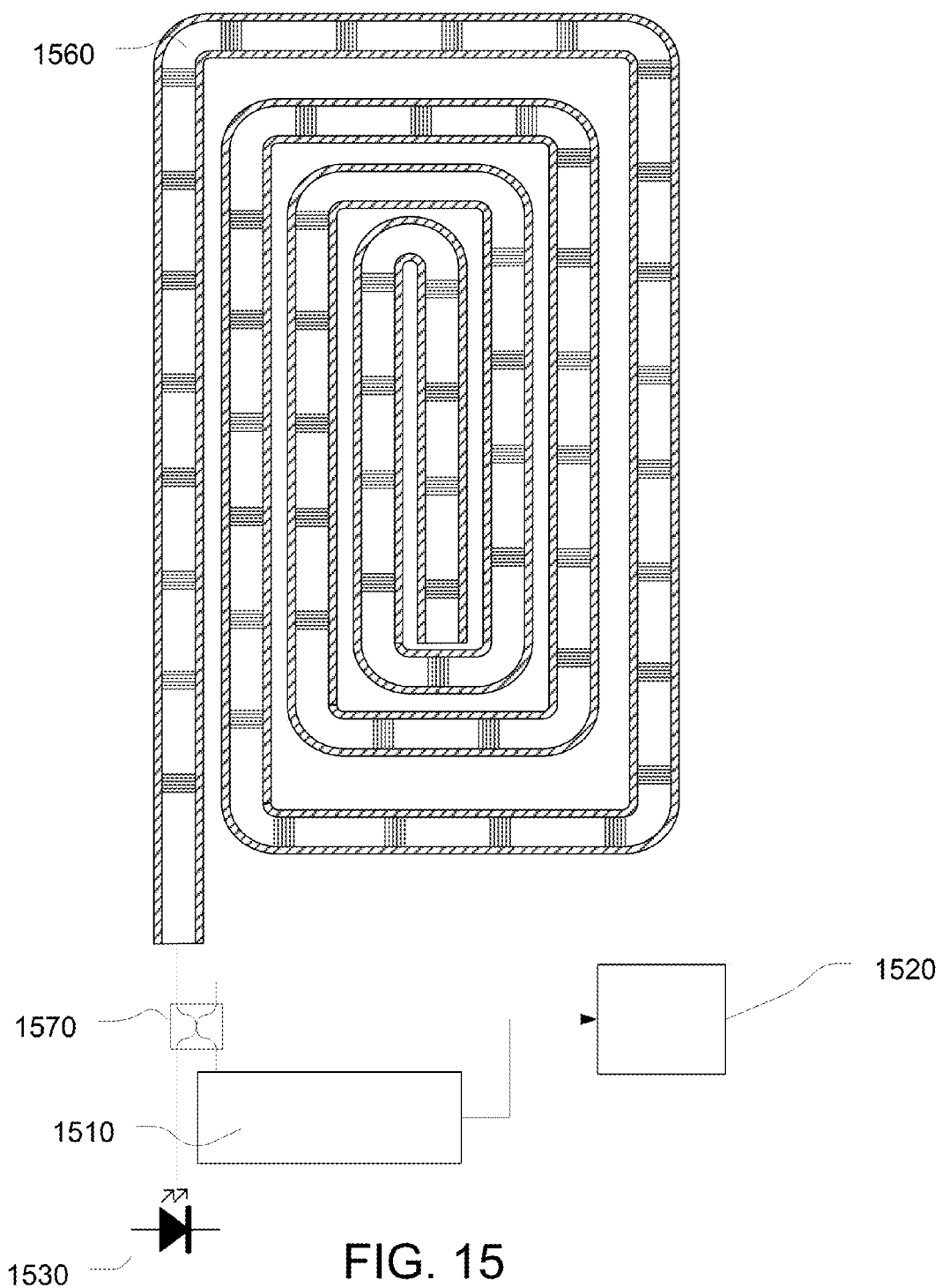
FIG. 15 illustrates an alternate embodiment of the force-sensitive computing device showing a single coiled enlarged-scale waveguide coupled to a single light source and a single spectrum interrogator.

FIG. 15 illustrates an alternate embodiment of the force-sensitive computing device showing a single spiraled enlarged-scale waveguide 1560 connected via optical couplings 1570 to a single light source 1530 also coupled to a single spectrum interrogator 1510 which in turn connect to processor 1520. As with the embodiments described above relating to FIG. 10, the interrogator 1510 may operate continually, periodically, or upon request.

Figure 16:
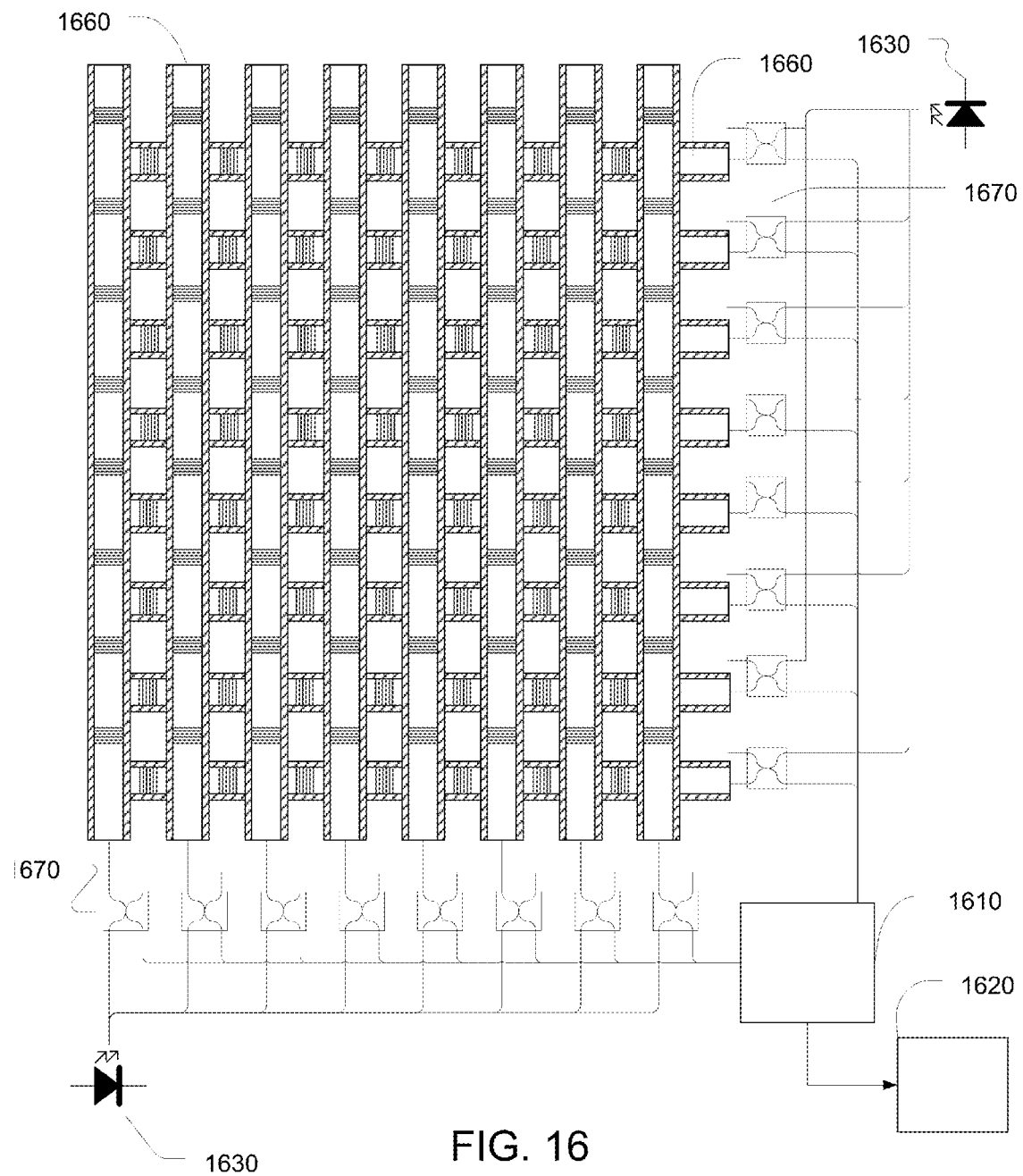
FIG. 16 illustrates an alternate embodiment of the force-sensitive computing device showing an array of enlarged scale waveguide coupled to dual light sources with a single spectrum interrogator.

FIG. 16 illustrates an alternate embodiment of the force-sensitive computing device showing a multiple individual enlarged-scale waveguides 1660, organized in an array, connected via optical couplings 1670 to dual light sources 1630 also coupled to a single spectrum interrogator 1610 which in turn connect to processor 1620. As with the embodiments described above relating to FIG. 10, the interrogator 1610 may operate continually, periodically, or upon request.

It may also be noted FIGS. 1B-16 are not drawn to scale. It may be appreciated that optical waveguides are often not perceivable without substantial magnification. In certain embodiments, optical waveguide may be as small as 40 µm, or for example roughly half the width of one pixel of a display screen with 326 ppi (pixels per inch) resolution. In certain other embodiments an optical waveguide may be smaller or larger than 40 µm.

Figure 17:
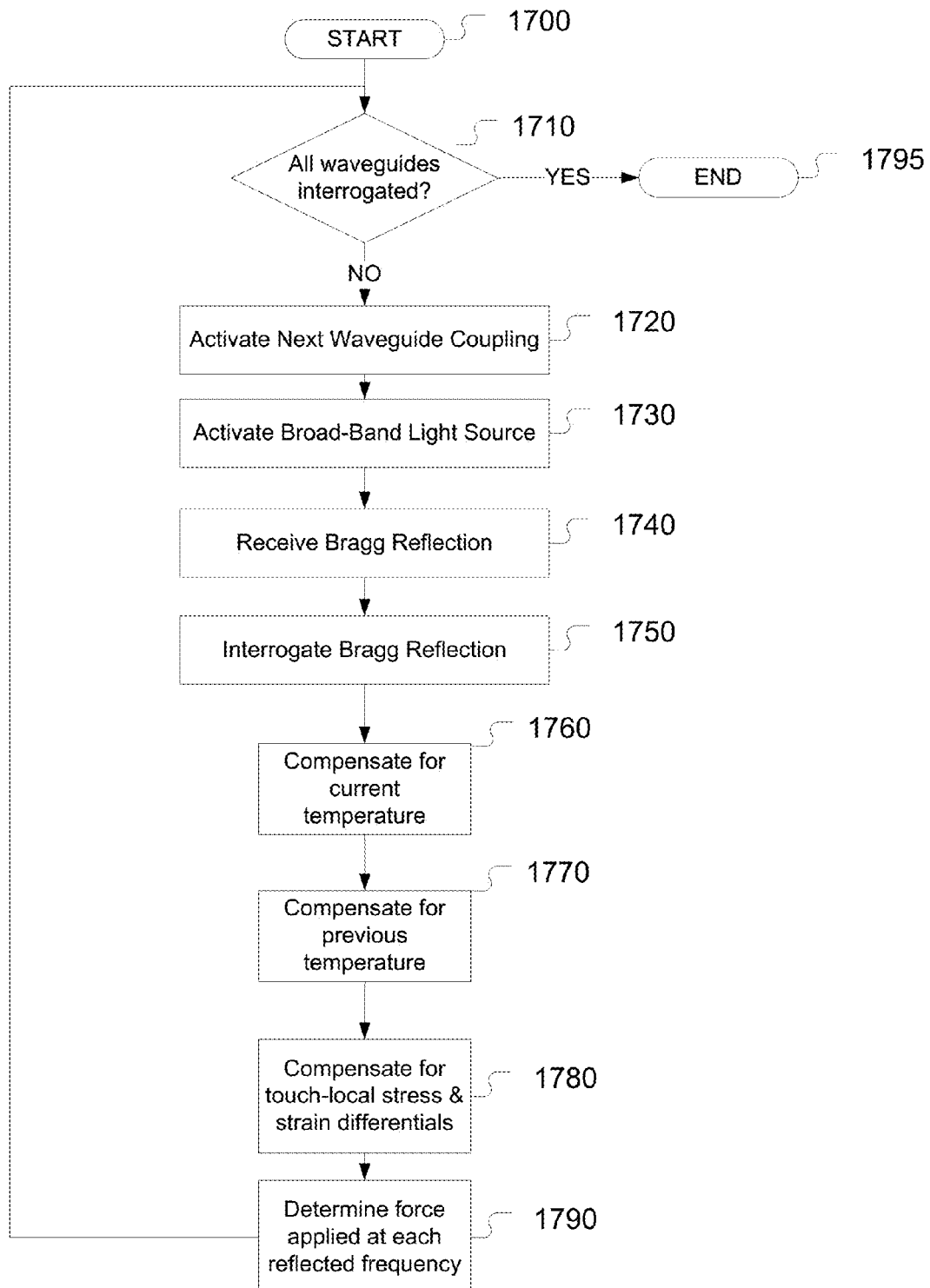
FIG. 17 is a representative flow chart of an example method for determining the force applied to the surface of the force-sensitive computing device.

FIG. 17 is a representative flow chart of an example of a method for determining the force applied to the surface of the force-sensitive computing device. The process may start at 1700.

At 1710, it is determined whether there are remaining Bragg grating waveguides yet to be interrogated.

If there are additional waveguides to be interrogated, the method continues to 1720 wherein the next waveguide coupling is activated, optically coupling the waveguide to be interrogated to the interrogator.

Next, 1730 activates a light source which may be optically coupled to the waveguide. As previously mentioned, the light source may output light in the visible spectrum or in the near-visible spectrums. In still further embodiments, a sweep tunable laser may be used as a light source. In such a circumstance, the tunable laser only emits a particular wavelength at a particular time, sweeping across a certain band of wavelengths. Next, the interrogator receives the reflected spectrum from the active waveguide at 1740.

The interrogator may convert the reflected spectrum into a set of actual reflected Bragg wavelengths at 1750. In certain embodiments, this may be accomplished by use of a spectrum analyzer. In other embodiments, silicon-based CCD image sensors may be used to determine the actual reflected Bragg wavelengths. Further embodiments, for instance embodiments using a sweep-tunable laser as a light source, may use a reflection timestamp correlated with the laser output to determine reflected Bragg wavelengths.

Next, at 1760 the interrogator or processor may adjust the actual reflected Bragg wavelengths as a function of temperature change. In certain embodiments, a user's finger may cause the input surface and the force-sensitive input element to increase or decrease in temperature. A change in temperature may, as a function of the thermal expansion constants of the material of the input surface, waveguides, and surrounding materials (e.g. adhesives and housing components), cause either thermal expansion or thermal compression, which may alter the actual reflected Bragg wavelength.

In certain embodiments the interrogator or processor may use information gathered from other sensors, for example a touch sensor (e.g. a capacitive or resistive touch sensor determining location and duration of a user's touch), or ambient temperature sensor, to calculate the predicted reflected Bragg wavelength shift as a result of temperature change. Once the temperature change (from the known base temperature, when the Bragg grating was created) is determined, it may be multiplied by the coefficient of temperature of the material of the optical waveguide to determine the predicted thermal shift in Bragg wavelength. The coefficient of temperature is equal to the sum of the thermal expansion of the optical fiber comprising the optical waveguide summed with the thermo-optic coefficient (i.e. change in refractive index as a function of temperature). Once the predicted thermal shift in wavelength is calculated, it may be subtracted from the initial wavelength determination made by the interrogator to negate the effects of temperature.

Next, at 1770 the interrogator or processor may adjust the actual reflected Bragg wavelengths as a function of past temperature change. In certain embodiments, a user's finger may cause the input surface and the force-sensitive input element to change temperature. Once the user's finger is removed, the localized temperature increase may not decrease immediately due to thermal hysteresis. Or for another example, if ambient temperature changes rapidly the entire force-sensitive input element may not change temperature immediately. As previously noted, temperature change may cause either thermal expansion or thermal compression, which may alter the actual reflected Bragg wavelength. In certain embodiments the interrogator or processor may use historical information gathered from other sensors, as well as previous local temperature information, to calculate the predicted reflected Bragg wavelength shift as a result of thermal hysteresis. Once the predicted thermal shift is calculated, it may be subtracted from the wavelength determination made by the interrogator to negate the effects of thermal hysteresis.

Next, at 1780, the interrogator or processor may adjust the actual reflected Bragg wavelengths as a function of varying force resistivity across the area of the force-sensitive input element. In certain embodiments, the force-sensitive input element may be mounted in a portable computing device along with other electronic and structural components.

Figure 19:
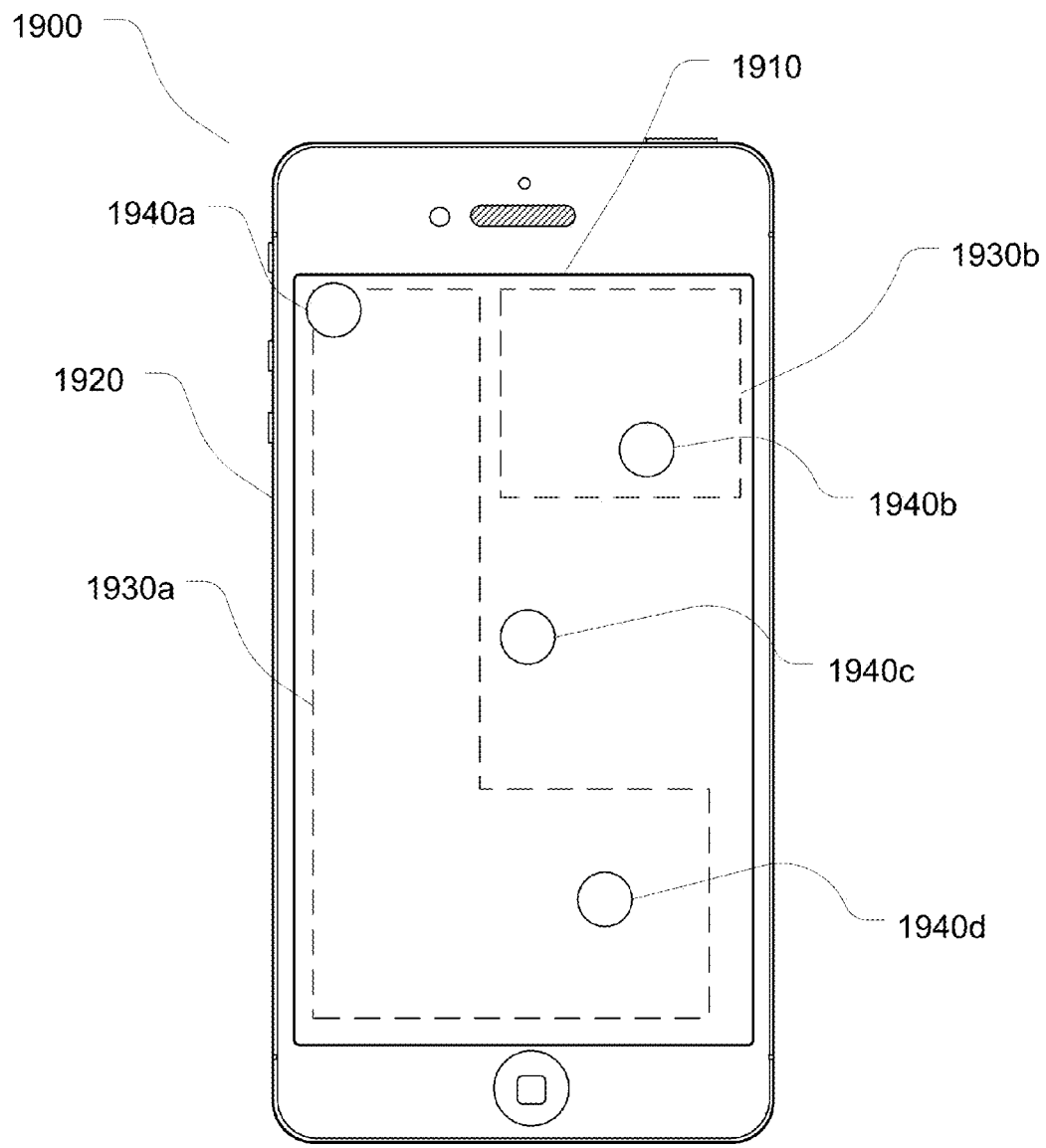
FIG. 19 is a front perspective view of an example force-sensitive computing device incorporating a force sensing device, having other internal components, showing four representative points across the surface of the device.

For example, turning to FIG. 19, there is shown an example force-sensitive computing device 1900. In the illustrated embodiment, the computing device 1900 may include an enclosure frame 1920, input surface 1910, and internal components of varying sizes (e.g. internal component 1930a and 1930b). Also illustrated are four different touch locations where a user may touch along input surface 1920, labeled 1940a-d. One may appreciate that each one of the points 1940a-d will have a different force resistivity because of the relative location on the input surface 1910 of computing device 1900. For instance, touch location 1940a will receive substantially more structural support from enclosure frame 1920, and internal component 1930a, and therefore substantially more force resistance than its counterpart touch location 1940c. Similarly, touch locations 1940b and 1940d have different force responses due to different proximities to the structural support of enclosure frame 1920 and different proximities to internal components 1930a and 1930b.

As a result of different force responses across the surface of the force-sensitive input element, the same amount of deflection at different locations may correspond to different forces applied. For example, the positioning of the internal components may not be uniform, and may provide different resistance when confronted with a force. Furthermore, the force-sensitive input element may be more resistive to forces applied proximal to mounting points than it is to forces applied distal to mounting points.

Returning to FIG. 17, in certain embodiments of 1780, the interrogator or processor may adjust the calculated force based on the known physical layout, structural properties, and force response of the device in which the force-sensitive input element is mounted by associating a particular location across the area of the force-sensitive input element with a localized force resistance coefficient.

Next, at 1790, after applying the several compensating factors (i.e. temperature, thermal hysteresis, and localized force responses), the compensated received Bragg wavelengths may be compared to the expected based wavelengths. The difference between the compensated Bragg wavelength and the expected Bragg wavelength for a particular Bragg grating may then be divided by the coefficient of strain to determine the strain experienced by the grating at the time the initial wavelength interrogation occurred.

Next, 1710 is repeated. If there are no remaining waveguides to be interrogated, the method may end at 1795.

In certain other embodiments, the method as shown in FIG. 17 may be performed continuously, periodically, or at select times. In addition, the method may be repeated, as shown at 1710, or without repetition. It should be appreciated that not all potential embodiments will complete each step of the example method. For example, temperature compensation may be performed after structural response compensation. In other embodiments, one or more of the illustrated steps may not be performed at all. In certain other embodiments, steps may be performed in a different order, or one or more steps may be omitted or additional intermediate steps may be added.

Figure 18:
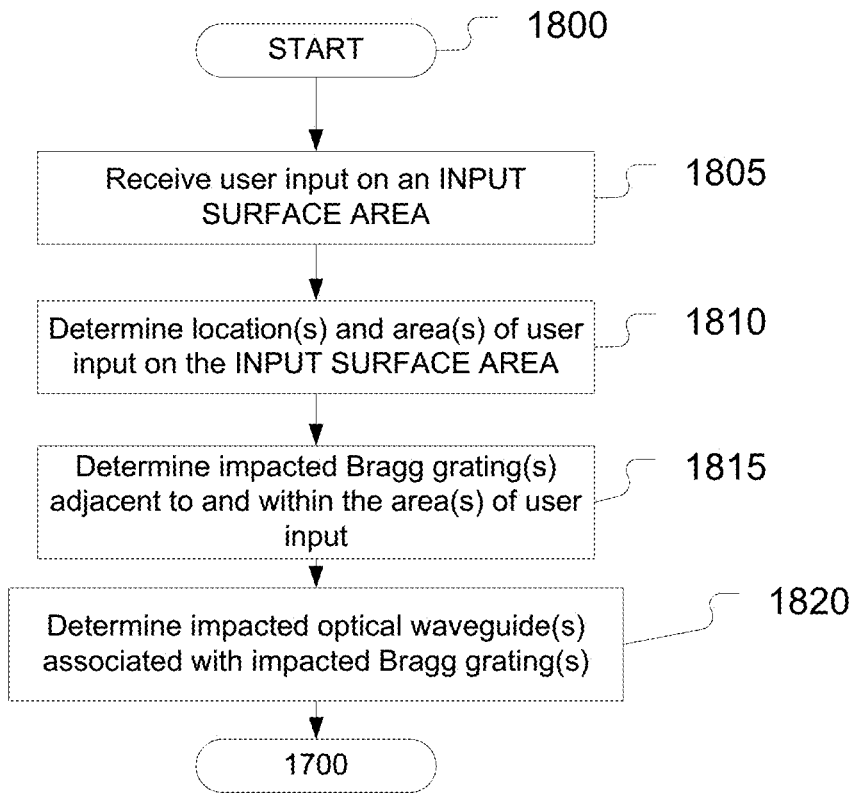
FIG. 18 is a representative flow chart of an example method for determining the force applied to the surface of the force-sensitive computing device.

FIG. 18 is a representative flow chart of an example process of determining the force applied to the surface of the force-sensitive computing device. In order to more efficiently measure the force applied by a user, it may only be necessary to measure force applied at or near areas the user touches. The process may start at 1800.

Next, 1805 receives a user input on an input surface. In certain embodiments, the input surface may be the cover glass of an electronic device. In other embodiments the input surface may be the top surface of a track pad input device.

Next, 1810 determines the location or locations of the user input at the input surface of the electronic device. In certain embodiments, this input may be at a single location (i.e. single touch) or in other embodiments this input may be received at multiple locations (i.e. multi-touch). In either the case of single touch or multiple touches, the location determination includes a determination of the area which the user is touching. The area impacted by the user may be different for different kinds of touch events. For example, in the case of a light touch, only a small area of the user's finger may impact the input surface of the device. In the case of a forceful touch, the user's finger may impact a larger area on the input surface of the device.

Next, 1815 determines which Bragg gratings are within or adjacent to the area or areas the user touches during a touch event. In certain embodiments, in order to associate a location with particular Bragg gratings, an associated computing device or processor may employ a look-up table or other database. In other embodiments, an associated computing device may instead associate individual optical waveguides with potential areas of the input surface. In the first example embodiment, where individual gratings are associated with individual locations on the input surface, the associated computing device may employ a second look-up table or other database to determine which optical waveguide is associated with the determine Bragg gratings. In the case of either embodiment, 1920 determines which optical waveguide is associated with the location and area of user input. In still further embodiments, the determination of which Bragg gratings are within or adjacent to the area or areas the user touches during a touch event may be calculated in real time. The method shown in FIG. 18 may then join with the method shown in FIG. 17 at step 1700 to determine force applied to the input surface using only the Bragg gratings within or adjacent to the touch locations(s)

The embodiments described in this disclosure relate to force-sensitive input elements providing to an associated computing system descriptive information downward force information of a user's contact at a single or various locations. By coupling Bragg-grated waveguides to an input surface, forces applied to the input surface by a user may place specific Bragg gratings under stress. By measuring the differences in the Bragg wavelength actually reflected from the Bragg gratings at known locations, and by compensating for unwanted effects of temperature and varying force resistivity, an accurate force measurement may be associated with a particular location on the input surface of the device. The computing device can be a tablet computer, touchpad device, notebook or laptop computer display or touchpad, desktop computer display or touchpad, a media player, a gaming device or controller, a smart watch, or any other type of input button or other input device.

While the present disclosure has been described with reference to various embodiments, it will be understood that these embodiments are illustrative and that the scope of the disclosure is not limited to the many variations, modifications, additions, improvements are possible. More generally, embodiments in accordance with the present disclosure have been described in the context of specific embodiments. Functionality of the disclosed embodiments maybe separated or combined into further various embodiments, or in the alternative, described with different terminology. These and other modifications, variations, additions, and improvements may fall within the scope of the disclosure as defined in the claims that follow.

What is claims is:

1. An electronic device comprising:
 a housing enclosing an electronic component, the housing defining an input surface for receiving a force applied by a user;
 a group of optical waveguides operatively affixed to and distributed across the input surface, each optical waveguide of the group of optical waveguides comprising:
 a length; and
 a plurality of Bragg gratings distributed along the length, each Bragg grating of the plurality of Bragg gratings configured to reflect a different wavelength of light;
 a light source optically coupled to at least one optical waveguide of the group of the optical waveguides;
 a wavelength interrogator optically coupled to the at least one optical waveguide and configured to detect changes in each different wavelength of light associated with the at least one optical waveguide; and
 a processor operatively connected to the wavelength interrogator and configured to:
 adjust an output of the wavelength interrogator based on a position of the electronic component within housing to compensate for effects of force resistivity of the input surface and temperature of the input surface adjacent to the position; and
 determine a magnitude of force applied and a location at which the force is applied by the user based on the adjusted output.

2. The electronic device of claim 1, wherein at least one optical waveguide of the group of optical waveguides comprises a substantially transparent fiber.

3. The electronic device of claim 1, wherein at least one optical waveguide of the group of optical waveguides is etched into the input surface.

4. The electronic device of claim 1, wherein the electronic device comprises at least one of a display, a button, or a trackpad.

5. The electronic device of claim 1, further comprising
 a temperature sensor coupled to the processor and configured generate an output corresponding to the temperature of the input surface; wherein the processor is configured to use the output of the temperature sensor to adjust the magnitude and the location to correct for thermal drift.

6. The electronic device of claim 1, further comprising a touch sensor disposed below the input surface, the touch sensor operatively coupled to the processor.

7. The electronic device of claim 1, wherein the group of optical waveguides comprises a first optical waveguide and a second optical waveguide, the first optical waveguide positioned adjacent to the second optical waveguide.

8. The electronic device of claim 7, wherein each of the plurality of Bragg gratings of the first optical waveguide are aligned with a respective one Bragg grating of the plurality of Bragg grating of the second optical waveguide.

9. The electronic device of claim 7, wherein each of the plurality of Bragg gratings of the second optical waveguide reflect a different wavelength of light from each of the plurality of Bragg gratings of the first optical waveguide.

10. The electronic device of claim 7, wherein each of the plurality of Bragg gratings of the first optical waveguide reflect the same wavelength of light as only one of the plurality of Bragg gratings of the second optical waveguide.

11. The electronic device of claim 1, wherein the light source comprises a superluminescent diode.

12. The electronic device of claim 1, wherein the light source comprises a tunable sweep laser.

13. A method of measuring force in an electronic device, the method comprising:
 receiving a force input proximate to an optical waveguide operatively affixed to an input surface, the optical waveguide comprising a Bragg grating having a reflection wavelength, the Bragg grating formed at a location on the optical waveguide;
 activating a light source optically coupled to the optical waveguide;
 receiving a reflection wavelength from the Bragg grating;
 determining an actual Bragg reflection;
 determining a first adjusted reflection by modifying the actual Bragg reflection to compensate for effects of temperature;
 determining a second adjusted reflection by modifying the first adjusted reflection to compensate for force resistivity characteristics of the input surface or the electronic device local to the force input;
 determining a change in reflection from the difference between the second adjusted reflection and the actual Bragg reflection; and calculating a magnitude of the force input received at the location on the optical waveguide based on the change in reflection.

14. The method of claim 13, the method further comprising determining a third adjusted reflection by modifying the actual Bragg reflection to compensate for effects of force resistivity at the location on the optical waveguide.

15. The method of claim 13, the method further comprising determining a third adjusted reflection by modifying the actual Bragg reflection to compensate for effects of thermal hysteresis at the location on the optical waveguide.

16. The method of claim 13, the method further comprising determining a third adjusted reflection by modifying the actual Bragg reflection to compensate for effects of thermal hysteresis at the location on the optical waveguide.

17. A method of measuring force in an electronic device, the method comprising:
  receiving a force input to an input surface, the input surface operatively affixed to a group of optical waveguides each optical waveguide comprising a plurality of Bragg gratings each Bragg grating having a different reflection wavelength;
  determining an area over which the force input is received;
  determining a subset of optical waveguides that are within the area from the group of optical waveguide;
  activating a light source optically coupled to the subset of optical waveguides;
  receiving a reflection spectrum from the subset of optical waveguides;
  determining at least one reflected wavelength from the reflection spectrum;
  determining at least one first adjusted reflected wavelength by modifying the at least one reflected wavelength based on a determined temperature of at least one optical waveguide of the subset of optical waveguides;
  determining at least one second adjusted reflected wavelength by modifying at least one first adjusted wavelength based on force resistivity of the input surface;
  determining a change in reflection from a difference between at least one second adjusted reflected wavelength and at least one expected reflected wavelength; and
  calculating a magnitude of the force input based on the determined difference.

* * * * *